United States Patent
Ren et al.

(10) Patent No.: US 9,898,734 B2
(45) Date of Patent: Feb. 20, 2018

(54) METHOD AND SYSTEM FOR TERMINAL DEVICE-BASED COMMUNICATION BETWEEN THIRD-PARTY APPLICATIONS AND AN ELECTRONIC WALLET

(71) Applicant: DEUTSCHE TELEKOM AG, Bonn (DE)

(72) Inventors: Zhiyun Ren, Berlin (DE); Joerg Heuer, Berlin (DE); Klaus-Peter Hofman, Berlin (DE)

(73) Assignee: DEUTSCHE TELEKOM AG, Bonn (DE)

(*) Notice: Subject to any disclaimer, the term of this patent is extended or adjusted under 35 U.S.C. 154(b) by 432 days.

(21) Appl. No.: 14/653,321

(22) PCT Filed: Dec. 17, 2013

(86) PCT No.: PCT/EP2013/076885
§ 371 (c)(1),
(2) Date: Jun. 18, 2015

(87) PCT Pub. No.: WO2014/095850
PCT Pub. Date: Jun. 26, 2014

(65) Prior Publication Data
US 2015/0348015 A1 Dec. 3, 2015

(30) Foreign Application Priority Data
Dec. 19, 2012 (EP) .................................... 12198252

(51) Int. Cl.
*G06Q 40/08* (2012.01)
*G06Q 20/36* (2012.01)
(Continued)

(52) U.S. Cl.
CPC .......... *G06Q 20/36* (2013.01); *G06Q 20/085* (2013.01); *G06Q 20/325* (2013.01);
(Continued)

(58) Field of Classification Search
CPC ...................................................... G06Q 20/36
(Continued)

(56) References Cited

U.S. PATENT DOCUMENTS

| 2009/0234751 A1* | 9/2009 | Chan | G06Q 20/145 |
| | | | 705/26.1 |
| 2012/0123868 A1* | 5/2012 | Brudnicki | G06Q 20/20 |
| | | | 705/14.58 |

(Continued)

FOREIGN PATENT DOCUMENTS

| WO | WO 2006085805 A1 | 8/2006 |
| WO | WO 2012021864 A1 | 2/2012 |

OTHER PUBLICATIONS

Erika Chin et al: "Analyzing inter-application communication in Android", MOBISYS '11, ACM, US, Jun. 28, 2011 (Jun. 28, 2011), pp. 239-252, XP058004575.

*Primary Examiner* — Edward Chang
(74) *Attorney, Agent, or Firm* — Leydig, Voit & Mayer, Ltd.

(57) ABSTRACT

A method for terminal device-based communications between a third-party application and an electronic wallet includes: the third-party application setting up a connection to an Internet service; the third-party application receiving a request and setting up a communication channel between the third party application and the electronic wallet within the terminal device via the On-Device API; verifying, by the electronic wallet, an access right of the request of the third party application; the third-party application forwarding the request to the electronic wallet if the access right is approved; the electronic wallet generating a corresponding response; forwarding the response via the On-Device API to the third party application, wherein the third party application forwards the response to the Internet service.

18 Claims, 19 Drawing Sheets

(51) Int. Cl.
*G06Q 20/08* (2012.01)
*G06Q 20/32* (2012.01)
*H04L 29/06* (2006.01)
*H04W 4/00* (2018.01)

(52) U.S. Cl.
CPC ..... *G06Q 20/3226* (2013.01); *G06Q 20/3229* (2013.01); *G06Q 20/3278* (2013.01); *G06Q 20/3674* (2013.01); *H04L 63/0853* (2013.01); *H04W 4/003* (2013.01); *H04W 4/008* (2013.01)

(58) Field of Classification Search
USPC .......................................................... 705/35
See application file for complete search history.

(56) References Cited

U.S. PATENT DOCUMENTS

2012/0130839 A1* 5/2012 Koh ..................... G06Q 20/352
 705/26.1
2012/0166337 A1* 6/2012 Park ..................... G06Q 20/20
 705/44

* cited by examiner

METHOD AND SYSTEM FOR TERMINAL DEVICE-BASED COMMUNICATION BETWEEN THIRD-PARTY APPLICATIONS AND AN ELECTRONIC WALLET

CROSS-REFERENCE TO RELATED APPLICATIONS

This application is a U.S. National Phase application under 35 U.S.C. § 371 of International Application No. PCT/EP2013/076885, filed on Dec. 17, 2013, and claims benefit to European Patent Application No. EP 12198252.4, filed on Dec. 19, 2012. The International Application was published in German on Jun. 26, 2014 as WO 2014/095850 under PCT Article 21(2).

FIELD

The invention relates to a method and a system for terminal device-based communication between third-party applications and an electronic wallet, particularly managing data for use of internet services via the electronic wallet.

ABBREVIATIONS

NFC Near Field Communication
UICC Universal Integrated Circuit Card
SIM Subscriber Identity Module
APDU Application Protocol Data Unit
CRS Contactless Registry Service
PPSE Proximity Payment Systems Environment
API Application Programming Interface
IP Item Provider
mWallet Mobile Wallet
OTA Over The Air
POS Point of Sale
VAS Value added Service

BACKGROUND

An electronic wallet (hereinafter, simply referred to as a "wallet") refers to a hardware and software module within a terminal device, in most cases a mobile terminal device, such as a mobile phone or a smart phone, consisting of two parts:
- a security element (e.g. in the form of a SIM card/UICC or Java card integrated in the chip set of the terminal device), with Java applets thereon, which can be addressed by applications on the terminal device on the one hand side as well as via wireless radio communications (e.g. NFC) from acceptance points (i.e., card readers) in card emulation mode.
- software for visualization, management and enabling of user interaction for Java card applications located on the security element.

As a result, this architecture of the electronic wallet enables the mapping of real smart cards (for various application fields such as payment, loyalty card, coupons) to the terminal device, wherein the role of the chip of the actual card is taken over by the Java applets on the security element, for example, the UICC, and the role of the label (i.e. the inscription, design, logo and/or other designations) on the physical card is taken over by the wallet software on the terminal device, e.g. the mobile phone.

Here and in the following an "applet" is understood as an application configured for the execution on a security element. Instead of "applet" the synonymous term "cardlet" is also used in the following.

Furthermore, in the following an application configured to run under the operating system of the terminal device, is called an "app".

If the electronic wallet is located on a mobile terminal device such as a mobile phone, the electronic wallet is also to be referred to as a "mobile wallet".

The cards in the electronic wallet can then be used at appropriate points of acceptance like physical plastic cards; using wireless radio communication (e.g. short-range radio technique NFC) applets on the security element (such as UICC) can be addressed without any contact, for example at the supermarket checkout.

Thus, this technique enables the use of a security element (such as the UICC) as a multi-functional smart card, wherein the user benefits from the adequate level of safety for a smart card application: information cannot be read from the smart card, the smart card cannot be copied and its information are admitted for use only after entering a PIN where necessary.

For similar operations in the online world, however, other methods have been established. For example, payment transactions are performed by users reading their credit card information and entering it in web forms on web pages. The authentication of users at web pages is usually done by entering a user name and a password.

On mobile platforms (here and below, the term "platform" is to be understood as the operating system of a terminal device, "mobile platform" is to be understood as the operating system of a mobile terminal), again, it is common to connect one's payment card information once with an account of the mobile phone manufacturer, in order to pay for apps and other digital goods on the mobile terminal so that the acquisition of such goods may be invoiced in future, for example to a credit card. For the use of online services (such as the server-based storage of photos), it is common to provide an app that allows access to the centrally stored data from the mobile device. To this end the user name and password are stored to this app.

US 2009/0 234 751 A1 discloses an electronic wallet for a wireless mobile device, and a method of operating the electronic wallet. In an embodiment, the electronic wallet comprises wallet invocation means responsive to an external trigger originating externally from the wallet; user authentication means for authenticating the user of the electronic wallet upon invocation of the wallet by the external trigger; and means for returning card information stored in the wallet in dependence upon a form specified by the external trigger invoking the wallet. The external trigger may be a webpage accessed via an Internet web browser on the wireless mobile device, the webpage having a wallet trigger instruction embedded therein. The wallet trigger instruction may be an extension embedded into the header of the webpage accessed via the Internet web browser. The webpage may further include field ID tags mapping specific data fields in the wallet to form input fields provided in the webpage.

WO 2006/085 805 A1 is concerned with a method for performing electronic transactions in a network comprising a mobile subscriber terminal with a digital wallet and a browser, a server for the management of the transactions and a content provider. In the method, the subscriber selects a service and sends an order request to the content provider. As a reply, the content provider sends a transaction order form to the mobile subscriber. The subscriber then confirms the transaction and sends the transaction order form to the browser. The browser reads information needed for the transaction form from the digital wallet and fills in the order form with the read transaction data. The completed form is then sent to the server, which converts the completed form into a standardized transaction format. The content provider processes the completed order form and sends it to the content provider, who replies to the subscriber.

US 2012/0 123 868 A1 describes system for dynamically adjusting the wireless data emulation used by a portable communication device based on its geo-location. The system determines a geo-location of the portable communication device by transmitting the current geo-location data using a most appropriate channel to a server; receiving data regarding payment systems potentially co-located with the portable communication device; and configuring a payment system in the portable communication device with the data formats and other wireless point of sale data specific to payment system potentially co-located with the device.

US 2012/0 166 337 A1 shows a near field communication (NFC) terminal for performing secure payment that includes an NFC unit and a control unit. The NFC unit communicates with an external payment terminal and the payment unit transmits results obtained by processing transaction information and an electronic signature value of the transaction information to the payment terminal using the NFC unit. The payment terminal requests an external payment server to perform payment. An authentication certificate applet included in the payment unit generates the electronic signature of the transaction information. An electronic wallet applet included in the payment unit transmits the results obtained by processing the transaction information and the electronic signature value to the payment terminal.

US 2012/0 130 839 A1 describes techniques for managing modules or applications installed in the mobile device. To provide authentic and secure transactions with another device, each of the installed applications is provisioned with a server through data communication capability in a mobile device. A provisioned application is associated with the personalized security element of the mobile device and works with a set of keys that are generated in accordance with a key set from the personalized secure element. Further, management of controlling an installed application is described.

WO 2012/021 864 A2 shows a phone-based electronic wallet providing authenticated transactions across multiple channels of commerce. The electronic wallet may be used for point-of-sale payments, remote mobile payments and/or web-based payments, and may use authentication tools such as offline PINs, SecureCode PINs and/or online PINs.

Further state of the art is to be found in Erika Chin et al. "Analyzing inter-application communication in Android", MOBISYS, 11, ACM, US, 28 Jun. 2011, pages 239-252, XP058004575, DOI: 10.1145/1999995.2000018 ISBN: 978-1-4503-0643-0.

SUMMARY

In an embodiment, the present invention provides a method for terminal device-based communications between a third-party application and an electronic wallet. The electronic wallet is installed on a terminal device. The electronic wallet supports an On-Device Application Program Interface (API) integrated therein. The third-party application is installed on the terminal device. The third party application also supports the On-Device API. The method comprises: the third-party application setting up a connection to an Internet service, wherein the connection requires a data transfer to the Internet service; the third-party application receiving a request aimed at transmission of data from the Internet service; the third-party application setting up a communication channel between the third party application and the electronic wallet within the terminal device via the On-Device API; verifying, by the electronic wallet, an access right of the request of the third party application on the basis of security criteria defined in the On-Device API; the third-party application forwarding the request received from the Internet service to the electronic wallet if the access right of the third party application on the electronic wallet is approved; the electronic wallet processing the request and generating a corresponding response; forwarding the response from the electronic wallet via the On-Device API to the third party application, wherein the third party application forwards the response to the Internet service; and the third party application receiving a confirmation about successful forwarding of the reply to the Internet service. A security element is further connected to the terminal device. The electronic wallet processing the request and generating the corresponding response further comprises: the electronic wallet sending a request concerning the data to the security element; and the electronic wallet receiving a response concerning the data from the security element.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
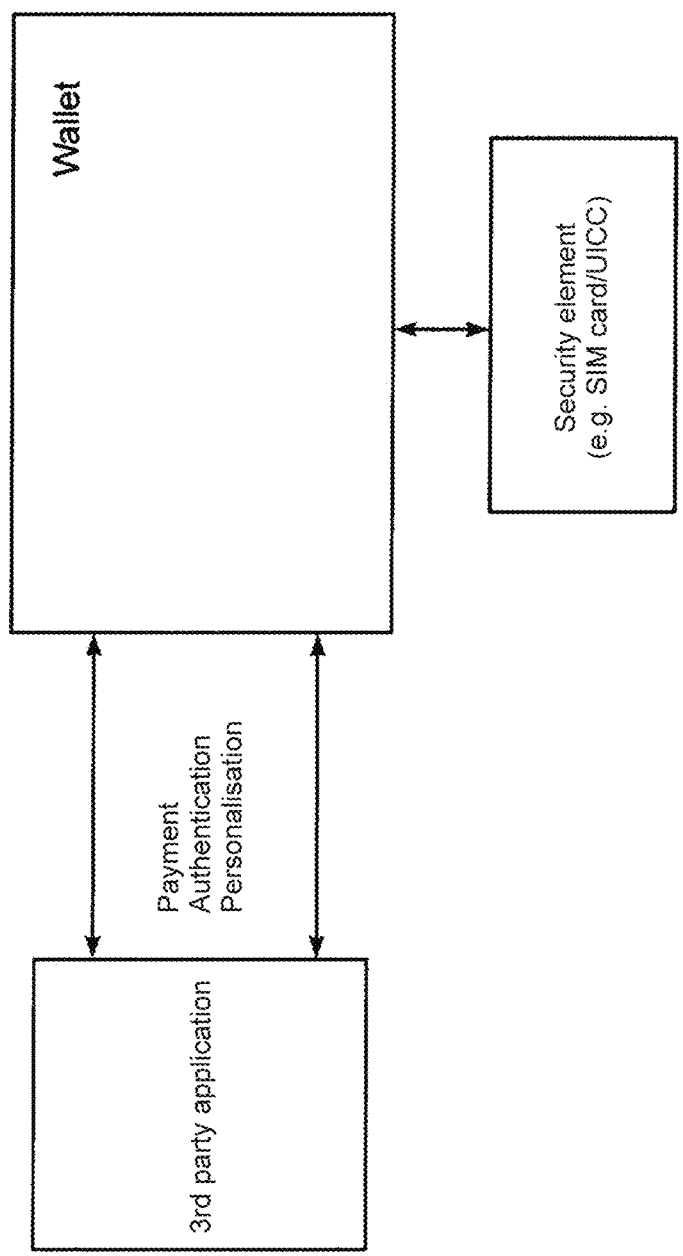
FIG. 1: The use of wallet functions by third-party applications (third-party apps)

The classic electronic wallet only works within an area close to a point of acceptance by means of wireless radio communication (e.g. NFC radio technology). However, more and more people use their mobile device to carry out transactions on the Internet. These are for example:

(i) online payment of digital goods (e.g. MP3-Download),
(ii) login to Web sites (e.g. social networks),
(iii) in-app payment of digital goods (e.g. purchase of virtual game items in game apps),
(iv) input of personal information into mobile apps.

Thus, there is a need for an electronic wallet which enables the performance of Internet transactions.

In an embodiment, the present invention provides an electronic wallet which enables the performance of Internet transactions. This is achieved by the method and the system for terminal device-based communication between a third-party application and an electronic wallet according to the claims.

One aspect of the invention refers to the method for terminal device-based communications between a third-party application and an electronic wallet. Here, the electronic wallet is installed on a terminal device, and the third-party application is installed on the terminal device. The method comprises the steps of:
(a) the third-party application setting up a connection to an Internet service, wherein the connection requires a data transfer to the Internet service;
(b) the third-party application receiving a request aimed at the transmission of said data from the Internet service;
(c) the third-party application forwarding the request received in step (b) from the Internet service to the electronic wallet;
(d) the electronic wallet processing the request and generating a corresponding response;
(e) forwarding the response from the electronic wallet to the Internet service;
(f) receiving a confirmation about the successful forwarding of the response to the Internet service according to step (e), wherein the reception is performed by the third-party application.

Here, the response that is generated according to the request for the transfer of those data may comprise all requested data, a portion of the requested data or none of the requested data (the latter is equivalent to a refusal of the data transfer), where the response may comprise the data in encrypted and/or unencrypted form.

In one embodiment of the method a security element is connected to the terminal device and step (d) of processing the request and generating a response comprises the steps of:
the electronic wallet sending a request concerning said data to the security element;
the electronic wallet receiving a response concerning said data from the security element;
and wherein the security element is preferably configured for wireless radio communications, such as radio-based near field communication (NFC).

In a preferred embodiment of the method, the security element is a Universal Integrated Circuit Card, UICC, or a SIM card.

In an alternative embodiment of the method, the step (d) of processing the request and generating a response comprises the steps of:
the electronic wallet transmitting a request concerning said data to an app, for example, another third-party application;
the electronic wallet receiving a response concerning said data from the app.

In a preferred embodiment of the method, the terminal device is adapted for mobile radio communications; the terminal device may be, for example, a mobile device or a smart phone, and/or be adapted for WLAN communications. The terminal device may be a laptop/a notebook or a tablet computer, for example.

In one embodiment of the method the data comprise confidential and/or user-specific information. For example, the data may comprise information for authentication. In particular, the data may include information for a login or for a payment process. The data may further include personal information.

In one embodiment of the method step (e) of forwarding the data comprises the steps of:

transmitting the data from the electronic wallet to a wallet backend;
establishing a connection between the wallet backend and the Internet service;
transmitting the data from the wallet backend to the Internet service.

In an alternative embodiment of the method step (e) of forwarding the data comprises the steps of:
transmitting the data from the electronic wallet to the third-party application;
transmitting the data from the third-party application to the Internet service.

In one embodiment of the method the third-party application is a service provider application installed on the terminal device that is configured to use the Internet service.

In one embodiment of the method the third-party application is an Internet browser installed on the terminal device.

One aspect of the invention relates to a system for terminal device-based communications between one or more third-party application(s) and an electronic wallet. Here, the system comprises a terminal device. The system is characterized in that an electronic wallet is installed on the terminal device and one or more third-party application(s) are installed on the terminal device. Here, the third-party application(s) are each configured to: set up a connection to an Internet service, wherein the connection requires a data transfer to the Internet service; receive a request aimed at the transmission of said data of the Internet service; and forward the request received from the Internet service to the electronic wallet. The electronic wallet is configured to: process said request and to generate a corresponding response; forward the response to the Internet service. Furthermore, the third-party application(s) are each configured to: receive a confirmation of a performed forwarding to the Internet service, wherein the receiving is performed by the third-party application.

Here, the response that is generated regarding to the request for the transfer of those data may comprise all requested data, a portion of the requested data or none of the requested data can (the latter is equivalent to a refusal of the data transfer), where the response may comprise the data in encrypted and/or unencrypted form.

In one embodiment of the system the terminal device is configured to incorporate one or more security elements, wherein one or more application programming interface(s) (APIs) are installed on the terminal device to list, select and interact with the security elements. The system further comprises one or more security element(s) that are incorporated in the terminal device, wherein the terminal device is connected to the one or more security element(s). Further, the electronic wallet is configured regarding to the processing of said request and generating of a corresponding response: to send requests for said data to the one or more security element(s); to receive responses concerning said data from the one or more security element(s).

Here, the security element is preferably configured for wireless radio communication, such as radio-based near field communication (NFC).

In a preferred embodiment of the system, the security element is a Universal Integrated Circuit Card, UICC, or a SIM card.

In an alternative embodiment of the system the electronic wallet is further configured with regard to the processing of said request and generating an appropriate response: to send a request concerning said data to an app, for example, another third-party application; and to receive a response concerning said data from the app.

In a preferred embodiment of the system the terminal device is adapted for mobile radio communications; the terminal device may, for example, be a mobile device or a smart phone and/or be adapted for WLAN communications. The terminal device may be a laptop/a notebook or a tablet computer, for example.

In one embodiment of the system the data comprise confidential and/or user-specific information. For example, the data may comprise information for authentication. In particular, the data may include information for a login or for a payment process. The data may further include personal information.

In one embodiment of the system the electronic wallet is configured regarding to the forwarding of the response to the Internet service to: transmit the data to a wallet backend. Furthermore, the wallet backend is configured: to establish a connection between the wallet backend and the Internet service; and to transmit the data to the Internet service.

In an alternative embodiment of the system the electronic wallet is configured regarding to the forwarding of the response to the Internet service to: transmit the data to the third-party application(s). Furthermore, the third-party application(s) are configured to transmit the data to the Internet service, respectively.

In one embodiment of the system the third-party application is a service provider application installed on the terminal device that is configured to use the Internet service.

In one embodiment of the system the third-party application is an Internet browser installed on the terminal device.

The present invention shows how the electronic wallet can be extended by means of On-Device APIs, such that the execution of transactions on the Internet is enabled, and in particular, those scenarios described under items (i) to (iv) can be supported centrally by the electronic wallet (see FIG. 1).

In particular, the invention described in detail below obtains the following advantages:

Using the wallet the user needs only one point of contact to configure all the payment methods and to be able to look into previous payment transactions.

Personal information and login information for various services can be conveniently stored at one central location.

The user no longer has to trust different apps on his/her terminal regarding to the storage of security-related or personal information.

The electronic wallet has already been designed as a secure application on the terminal device for use at close range via wireless radio communications (such as NFC). This infrastructure can be reused for storing all security- or privacy-related personal information.

In particular, the smart card functions of the security element, for example, the UICC can be utilized for any application.

The invention is explained below with reference to examples and the drawing.

Mode of Operation of the Invention

Prerequisites:

1) The user has a mobile phone or another terminal device, which can incorporate one or more security elements.

2) There are APIs on the terminal device to list and select security elements and to address them via APDU commands.

3) The platform enables the interworking of separately installed apps via corresponding platform-specific mechanisms—the so-called "On-Device APIs" or "wallet APIs".

Method Description:

The method according to the invention is based on creating programming interfaces between any third-party applications (third-party apps) on the terminal device and the wallet on the terminal device in order to enable the exploitation of the functions of the electronic wallets by these third-party applications.

Figure 2:
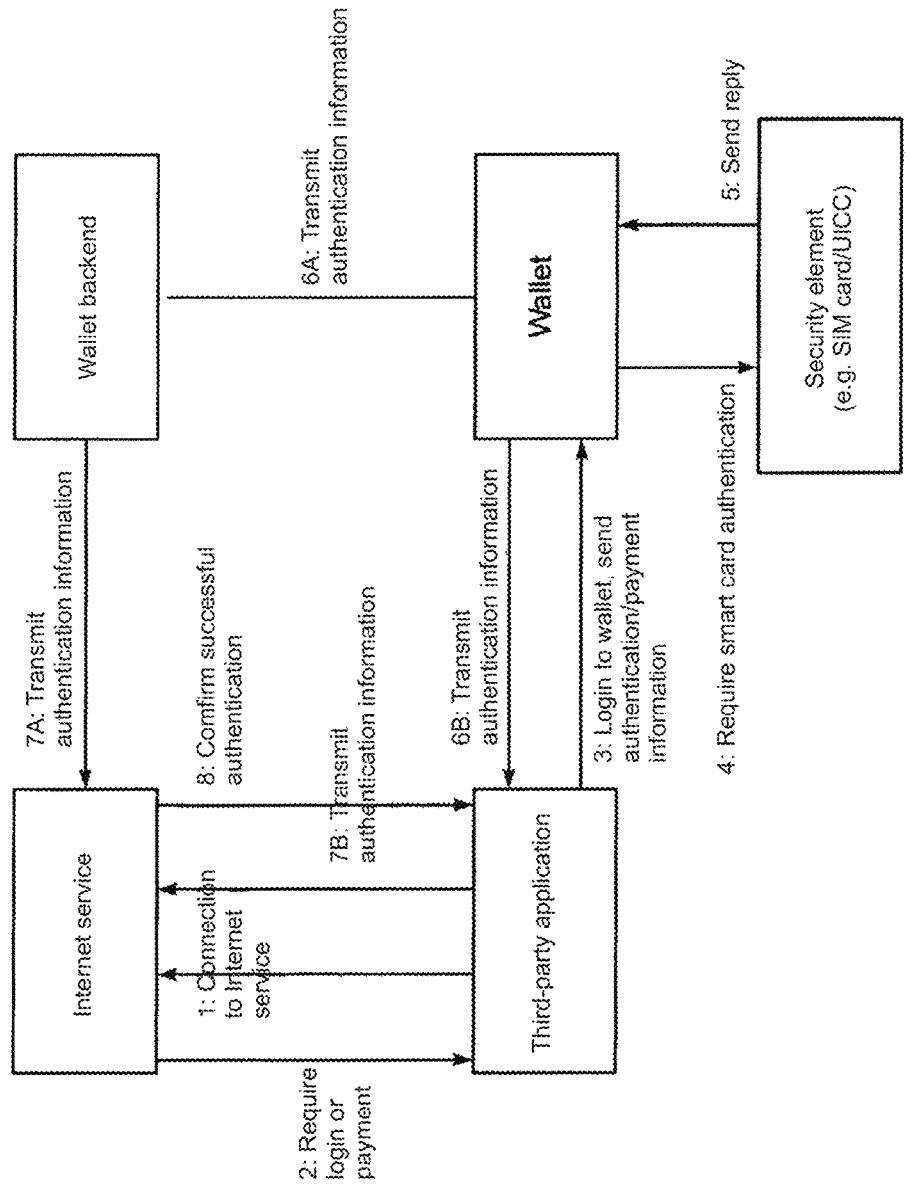
FIG. 2: The workflow of On-Device APIs' use.
Figure 3:
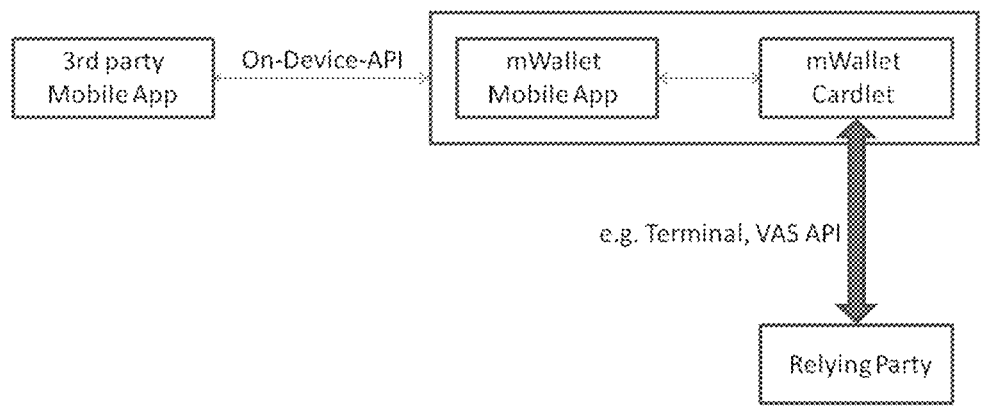
FIG. 3: An overview of the system according to the invention.
Figure 4:
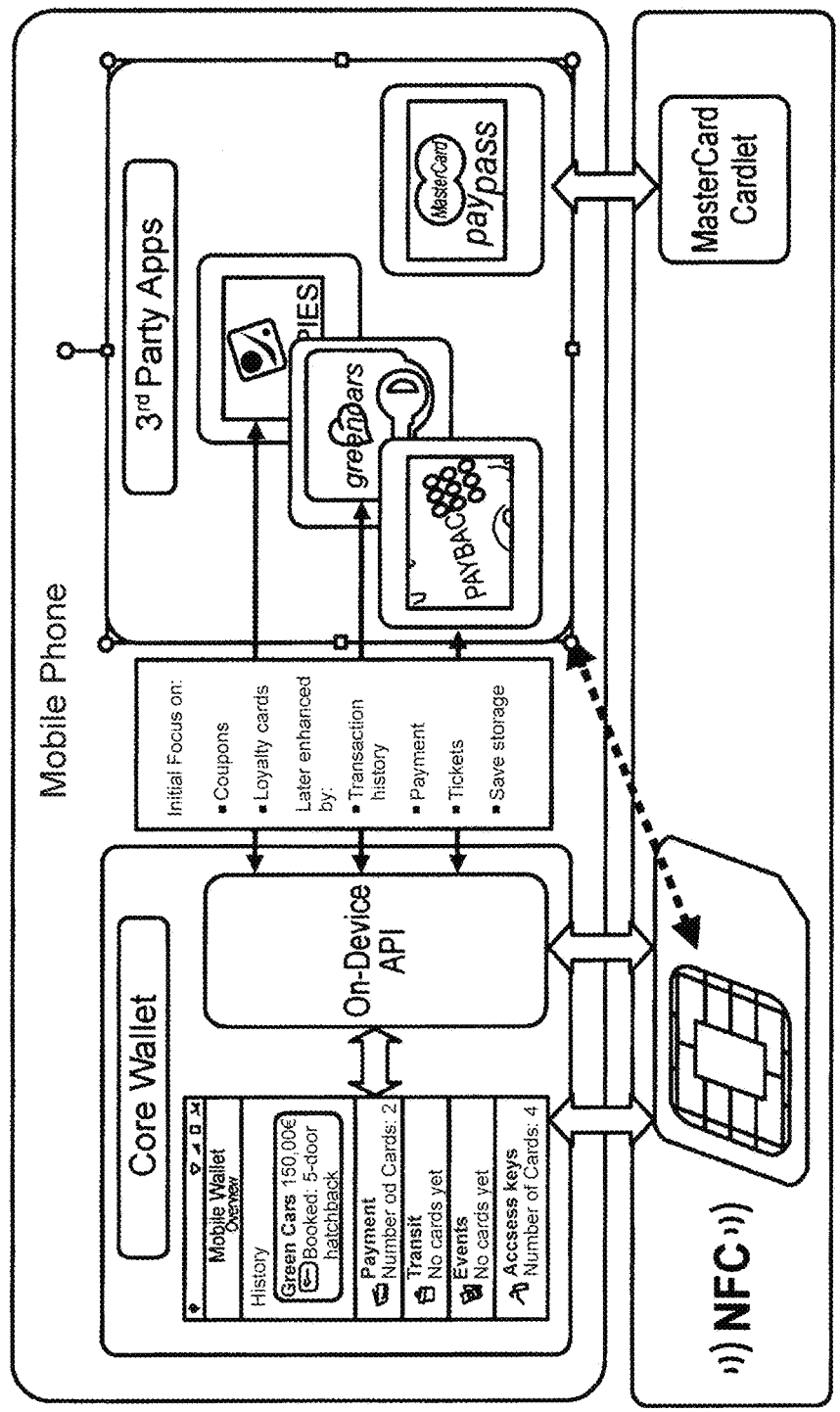
FIG. 4: An (NFC) ecosystem with On-Device API.

The use of the On-Device APIs of the wallet is embedded in the following sequence (cf. FIG. 2, the numbering of the steps in the following example does not correspond to the designations of the steps in the claim set)):

The third-party application on the mobile device connects to a service on the Internet (Internet service) that requires authentication in order to login or for payment or for the transfer of personal information (step 1).

The third-party application receives data for transmission to the wallet from the Internet service (step 2).

The third-party application passes these data to the wallet (step 3).

If necessary, the wallet uses authentication services of the security element, for example, the UICC (step 4 and 5).

Variant A:

The wallet passes the authentication information to a wallet backend (step 6A).

The wallet backend contacts the service on the Internet for forwarding the authentication information processed by the wallet (step 7A)

Variant B:

The wallet passes the authentication information to the third-party application (step 6B).

The third-party application forwards the authentication information to the service on the Internet (Step 7B).

The third-party application learns of the successful authentication by the Internet service (step 8).

Here, the On-Device APIs are used particularly in steps 3 and 6B.

Depending on the specific application scenario some of these steps are optional.

For example, the integration of the safety function is optional. Accordingly, not all terminal devices offer the ability to access a security element. However, the invention enables also the use of wallet services with rich functionality on such limited platforms. The wallet can for example bundle payment functions and in this case perform a "routing" of a third-party application that requires payment, to a payment tool realised as an app in the wallet (e.g. a special credit card and not the also existing cash card). Instead of using security features of a security element, this payment app can use other mechanisms to safeguard the transaction.

The wallet backend used in the variant A in the above example is located on a server of the wallet operator and is in turn addressed by the terminal device via an Internet connection. The background of this is to inform the Internet service via a merchant interface about the correct execution of the payment, if the communication flow of the steps 6A and 7A is to be used.

According to this scheme the following exemplary On-Device APIs (wallet APIs) can be implemented and be connected to the wallet in step 3. Here, the interprocess communication of the platform is applied (e.g. intents on Android platforms):

In-app purchase: The third-party application initiates a payment process for delivery of digital goods from a server on the Internet. Information about the nature of the goods and the price is forwarded to the wallet.

In-app authentication: The third-party application initiates a login to a server on the Internet (e.g. for access to cloud data). Information about the type of login is transferred to the wallet.

Configuration of personal information for social network: The app of a social network logs in to a social network on the Internet and forwards the request for personal information to the wallet. Having queried the user, the wallet returns the user's personal information. Optionally, data is delivered digitally signed, wherein an applet on the security element, such as a UICC, is applied (e.g. age verification).

Many more On-Device APIs are conceivable. In particular, the scenarios of the "in-app purchase" and the "in-app authentication" can easily be extended to a Web browser (for example, the mobile Web browser on a smart phone) rather than to the third-party application. In the former the URL mechanism of the platform is used for the On-Device API, i.e. the Internet service can address the wallet app directly through the Web browser using certain wallet URLs.

In the following, further examples are given concerning the On-Device API according to the invention in the context of couponing and loyalty scenarios. While the API is not limited to a certain category any additional scenario may be supported.

Definition and Scope of Loyalty/Couponing:

Loyalty: Loyalty refers to a bonus program aiming at point collection that is targeted at one or more merchants. Here, the user gets a certain amount of points which are calculated based on a logic which the loyalty scheme provider defines. Therefore, every time the user makes a purchase, he forwards his loyalty customer identification number via NFC/QR Code to the POS system, which calculates the bonus points and adds it to the user's balance. This loyalty type is POS IT backend centric, i.e. the wallet is only responsible for storing and forwarding the user's loyalty ID. The loyalty bonus points processing and management is done via the POS system and loyalty provider's IT.

Couponing: Coupons enable particular user groups to get discounts or other benefits when making a purchase. Coupons can e.g. give a discount (relative or absolute) on the whole basket or on dedicated products. Certain coupons can also have preconditions which need to be fulfilled by the user in order to redeem the particular coupon (e.g. get two, pay for one). The validation of coupons is done by the POS system. The coupon issuer's motivation is to steer the user's behaviour by incentivizing certain products or purchase pattern. Coupons are generally intended to be used only one time. Therefore every used coupon needs to be cancelled.

User Journeys

In the following, examples are given as to how the user may use the electronic wallet according to the invention ("user journeys").

The current scope of the electronic wallet (e.g. mWallet) On-Device API enables, for example, the following two user journeys. Focus of the journey is on couponing scenario, but may also be applied the same way to loyalty or other cards.

Figure 5:
FIG. 5: User operation 1: the user selects coupons in the app of a third-party and pays by means of his/her wallet.
Figure 5:
Figure 5:
Figure 5:
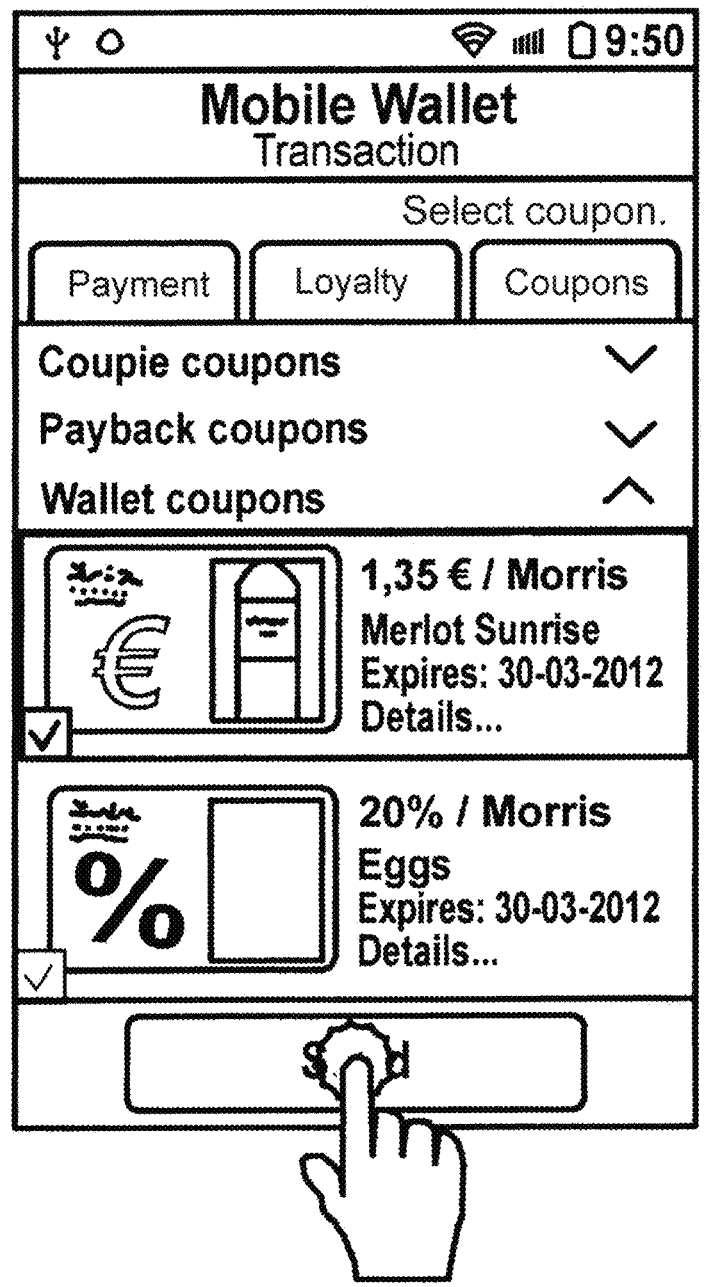
Figure 5:
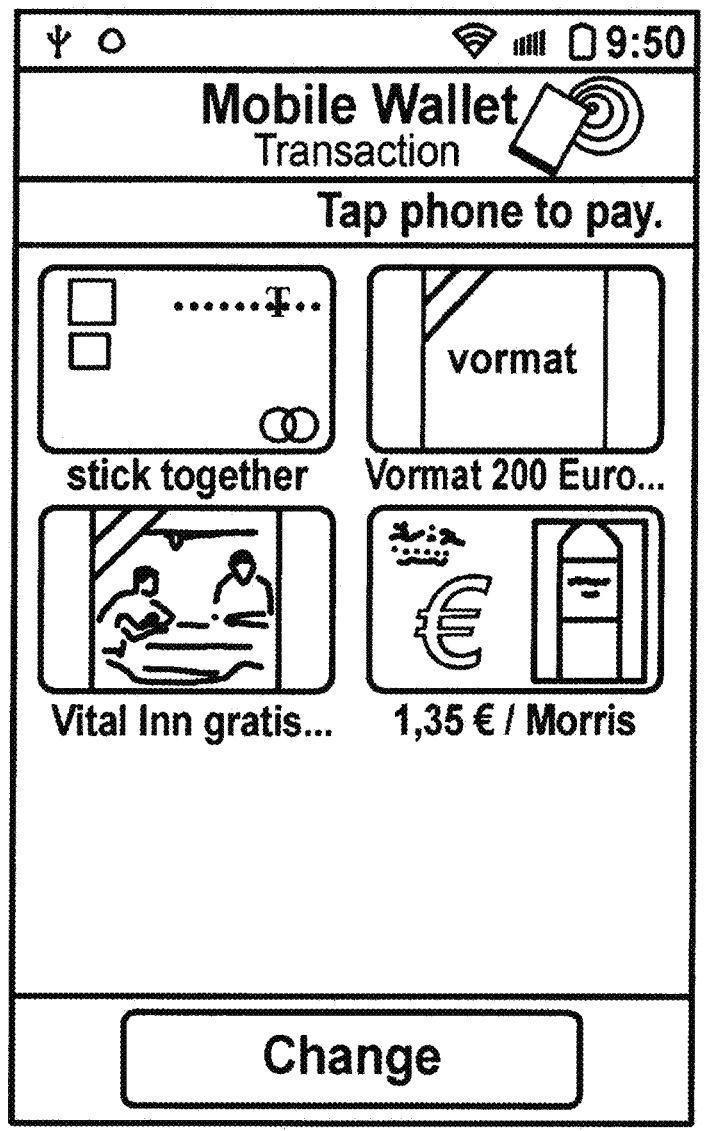

Referring to FIG. 5, a journey will be described, wherein the user selects coupons in the app of a third party and pays with the wallet:

Step one: In the third party app, the user may pre-select coupons for wallet usage and click the "Pay with Wallet" button to continue with the further payment with the wallet (FIG. 5a).

Step two: The wallet shows up and has to be opened by the user with the wallet pin. After successful authentication the coupon dialog is shown (FIG. 5b).

Step three: The user is free to choose additional coupons or payment cards before starting payment process. Coupons may be selected from various third party apps (FIG. 5c).

Step four: When the user has finished the card selection, payment can be started by clicking the "Send" button (FIG. 5d).

Step five: An overview of all selected cards I will be displayed, while the user is prompted to tap the mobile phone to the NFC terminal. Alternatively the user is requested to scan a set of QR codes at the POS (FIG. 5e).

Figure 6:
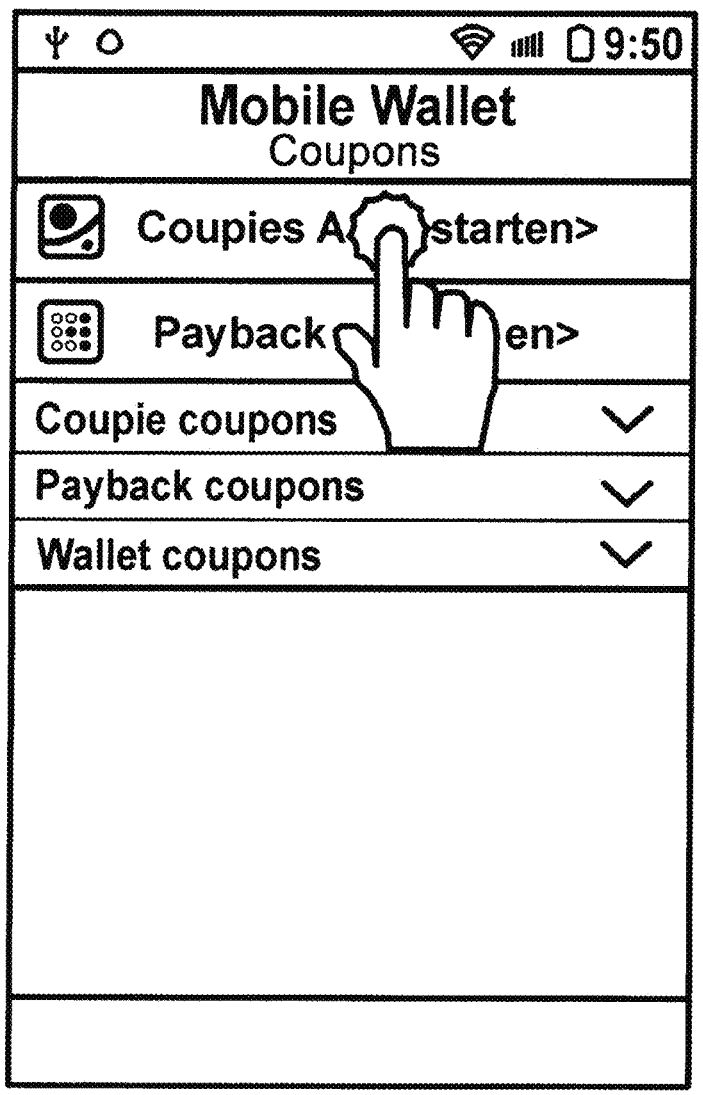
FIG. 6: User operation 2: the user selects coupons in the app of a third-party and pays by means of his/her wallet.
Figure 6:
Figure 6:
Figure 6:
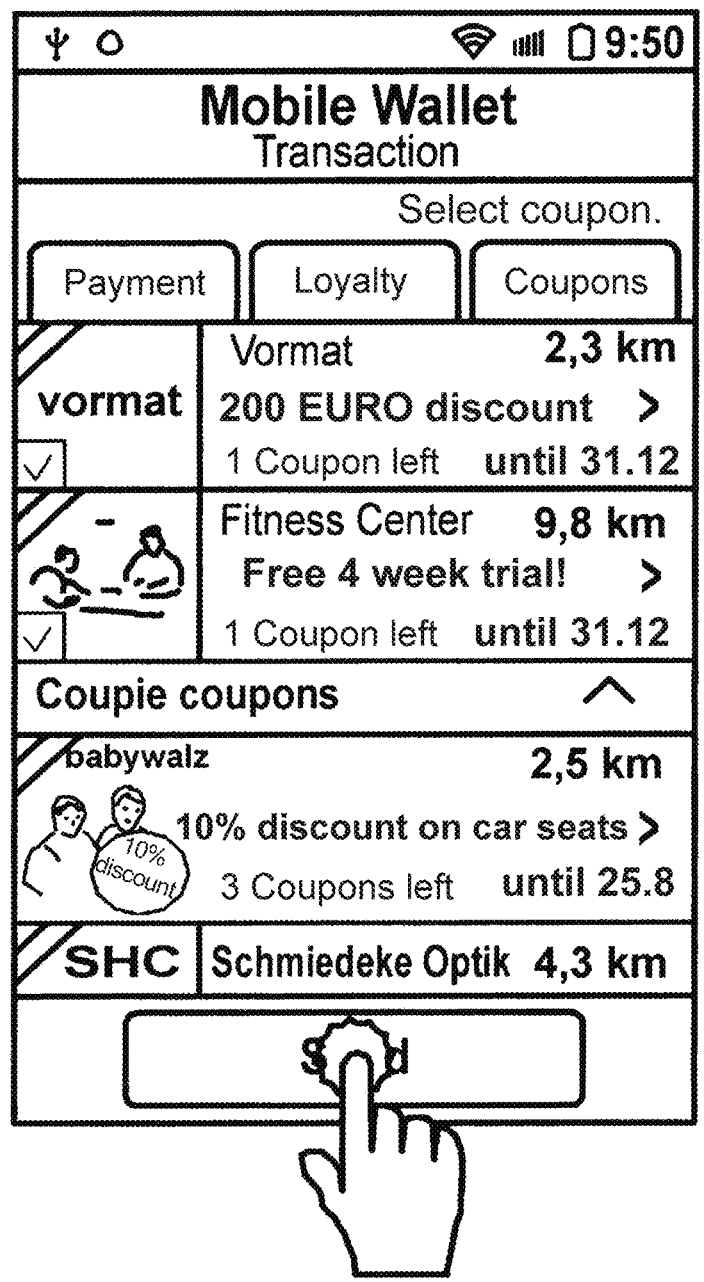
Figure 6:
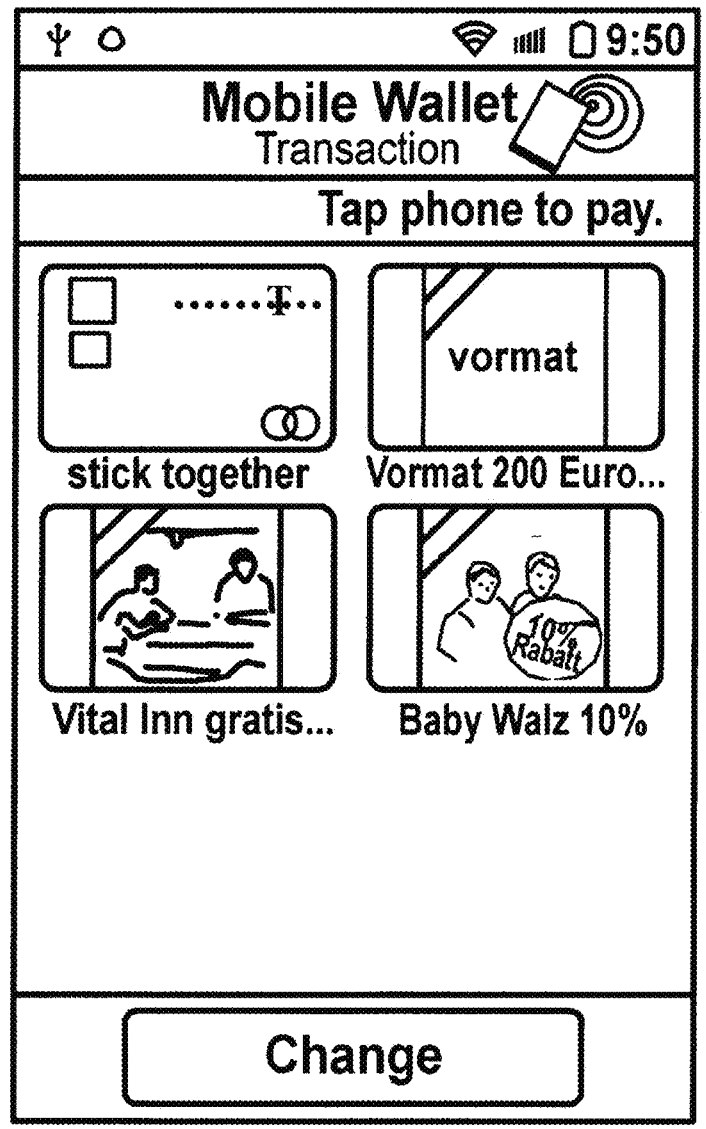

Referring now to FIG. 6, an alternative journey will be described, wherein the user selects third party coupons with the wallet:

Step one: From the wallet's coupon selection view the user may start a registered third party app for coupon selection (FIG. 6a).

Step two: Coupons may be selected in the third party application. By clicking the "Pay with Wallet" button the user is returned to the wallet and sees an updated view of all selected coupons (FIG. 6b).

Step three: The user is free to select additional coupons by selecting from the wallet he owns or from third party coupons. The list of third party coupons can be filtered by some criteria the defined by the third party application (FIG. 6c).

Step four: When the user has finished the card selection, payment can be started by clicking the "Send" button (FIG. 6d).

Step five: An overview of all selected cards I will be displayed, while the user is prompted to tap the mobile phone to the NFC terminal. Alternatively, the user is requested to scan a set of QR codes at the POS (FIG. 6e).

Use Cases

The On-Device API enables the following use cases, which are already outlined by the user journeys from above:

Use Case 1 (Register Item Provider): The entry point for third party apps as item provider for using the On-Device API is an initial login call. Item Provider login lets the wallet know about existence of the IP app on the mobile device and enables item provider supported On-Device features. Preferably, Use Case 1 is mandatory.

Use Case 2 (Display Items): After starting the electronic, the wallet (e.g. mWallet) queries all registered item providers for available items. It is up to the IP to decide which items are returned to the electronic wallet (e.g. mWallet). Depending on the application these may be user pre-selected items, items of interest or all available items. Items of all providers are displayed to the user in a list view for item usage and selection for an additional detail view. The wallet does not take ownership or store those items and holds only temporary references to the items resisting in the Item Provider application. Preferably, Use Case 2 is mandatory.

Use Case 3 (Use Item from Wallet): Depending on the item usage scenario (payment, access key) the user may select either one or multiple items of different domains for one transaction. In addition to this the transport channel (NFC, QR, HTTP) mandates whether the user has to present the item's data sequentially to the interacting party or all items data may be transferred in one user interaction. However, when using the wallet the user shall be able to select one or multiple items before starting the transaction. For example at a NFC point of sale—tokens for the selected items are requested at the item provider or a corresponding cardlet is activated. In case usage of a specific is token-based, the item provider needs to return the requested token to the electronic wallet (e.g. mWallet). Preferably, Use Case 3 is mandatory.

Use Case 4 (Use Item from Item Provider): Item provider apps may open the electronic wallet (e.g. mWallet) for using an item through specific capabilities like NFC, QR Code, or HTTP of the electronic wallet (e.g. mWallet).

Use Case 5 (Notify Usage): In case of a NFC transaction the wallet knows the final transaction status and will notify the item provider about item usage. Depending on the contract between NFC interaction point and item provider, additional item specific data may be forwarded to the item provider. For example, redeemed coupons can be invalidated and removed from the mobile wallet or earned loyalty points may be added to the user's loyalty account. Preferably, Use Case 5 is mandatory.

Use Case 6 (Remove Item): Items displayed in the wallet may be removed or deleted by the user. The responsible item provider is notified about this action and shall remove the item from the item list provided to the wallet. It is up to the provider to perform additional actions like physical deleting from the local storage or in the provider's backend. Preferably, Use Case 5 is optional.

Use Case 7 (Import Item): An item, for example, issued by point of sale and retrieved by mWallet via a NFC or scanning a QR Code, is passed by the electronic wallet (e.g. mWallet) to the corresponding item provider application for import.

Use Case 8 (Set/Unset Default Item): Items may be marked as default item in the electronic wallet (e.g. mWallet). The default item (one per domain) is used by default without explicit selection. Item provider will be notified, if an item is set or unset as default item. It is up to the IP to perform any actions like activating or deactivating a corresponding cardlet.

Use Case 9 (Invoke Item): The electronic wallet (e.g. mWallet) may request dynamic item data from the item provider, which is used for displaying item details. For example, this may be the actual number of loyalty points, the name of the owner, or account balance. In case the item includes HTML specific JavaScript code, the wallet will query the item provider for item specific dynamic data.

Use Case 10 (Launch Catalogue): To add additional items to the electronic wallet (e.g. mWallet) the item provider may provide a catalogue the user may select additional items from. These, for example, may be toggled as 'to be provided to the wallet' or retrieved online and physically imported to the provider data store.

General Requirements

In the following, general requirements for the On-Device API will be listed:

The registration of an item provider requires authorization. Most interactions are started by the electronic wallet (e.g. mWallet). For those no additional access control than initial registration is required. Only for interactions started by the item provider, invoking electronic wallet (e.g. mWallet) functionality, additional permissions are required and enforced by the electronic wallet (e.g. mWallet). Preferably, this requirement is mandatory.

Developers who want to use the complete On-Device API should register in order to get some form of credential (password, application key, or developer certificate, etc.). This data has to be used by their apps to perform on device registration/authentication against the electronic wallet (e.g. mWallet). Preferably, this requirement is mandatory.

It is anticipated that the UICC can be used as security anchor (Prerequisite: OTA channel available). Preferably, this requirement is optional.

In case that the sensitive data (e.g., prepaid voucher) is transferred between the wallet and the item provider, the communication channel should be protected in an acceptable way. Preferably, this requirement is optional.

On-Device API Specification

The electronic wallet (e.g. mWallet) On-Device API allows third party applications—so called Item Provider (IP)—to benefit from wallet functionality. For example, it allows items to be invoked in various transactions.

The On-Device API targets multiple functional wallet components, which results in two interfaces, which will defined below in detail:

Wallet interface: wallet transactions, item provider registration, payment, and IdM Item provider interface: wallet API with item management functionality.

Figure 7:
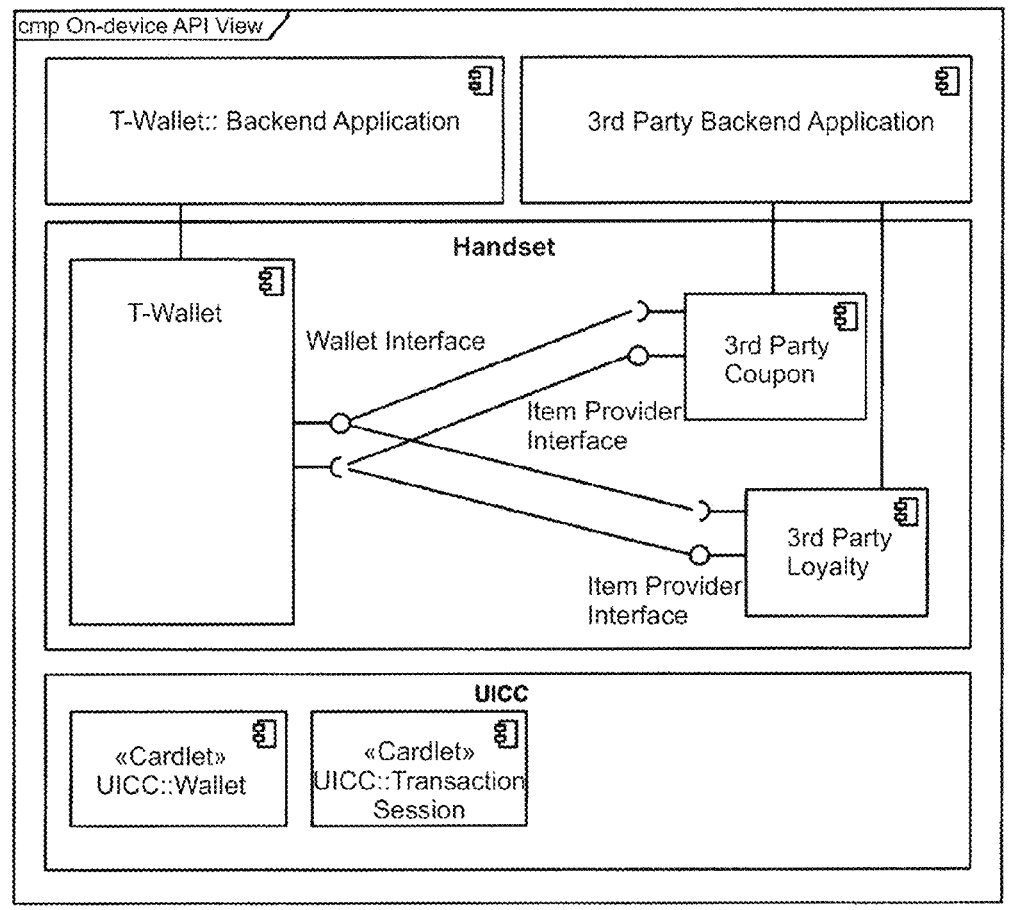
FIG. 7: A view of the components of the On-Device API.

FIG. 7 shows relationships between components and the interfaces provided and used. In addition, by way of example other elements of a complete wallet ecosystem on the UICC and backend side are illustrated. First of all there is the wallet app on the terminal device, which offers the wallet interface, that third-party applications on the terminal device can use for communicating with the wallet. By way of example there are shown two third-party applications from the fields of couponing and loyalty which use this interface. Furthermore, two applets on the UICC or the security element are shown for illustrative purposes, which are managed by the wallet. In the backend area, there are additionally illustrated the backend systems of both the wallet and the third-party applications that communicate over the Internet with the corresponding client applications on the terminal device.

Platform-Independent Interface Specification

The On-Device API defined in the following is an abstract API which is can be mapped to mobile platforms like Android, or Windows 8 as long the mobile platform provides an IPC mechanism between apps, which does not mandate user interaction. In the following, the platform specific implementation issues will be addressed.

Wallet Interface

The wallet interface contains all operations invoked by item providers.

TABLE 1

| | | Wallet Interface | | |
|---|---|---|---|---|
| Nr. | Use Case (UC) | Function | Input Parameter | Return |
| 1 | UC 1 | login( ) | Name, Description, Domains, Image, Callback, AccessToken | StatusCode |

TABLE 1-continued

| | | Wallet Interface | | |
|---|---|---|---|---|
| Nr. | Use Case (UC) | Function | Input Parameter | Return |
| | | Coupling between the wallet and IP apps is achieved through the login operation. Otherwise the wallet does not know the IP and will not query items from and reject all operation calls from the IP app. | Name: Display name of the IP Description: short description of the IP app Domains: types of items provided by the IP Image: image of the IP Callback: URI (string) the wallet can use to invoke operation on the IP app. AccessToken: authentication token | |
| 2 | UC 4 | useItem( ) | ItemId, AccessToken | StatusCode |
| | | Coupling between the wallet and IP apps is achieved through the login operation. Otherwise the wallet does not know the IP and will not query items from and reject all operation calls from the IP app. | ItemId: IP specific identifier of the item to be used with the wallet. AccessToken: token to be checked, whether item provider is permitted to invoke this operation. | |

Item Provider Interface

The following table lists operations to be implemented by the item provider app and invoked by the wallet if available.

TABLE 2

| | | Service Provider Interface | | |
|---|---|---|---|---|
| Nr. | Use Case (UC) | Function | Input Parameter | Return |
| 3 | UC 2 | getItems( ) Retrieve a list of currently available items. | Domain Domain: type of item to be returned. | List of <ItemId> List of item identifiers. |
| 4 | UC 2 | getDisplayToken( ) Get display information of an item. | ItemId ItemId: IP specific identifier of the item of interest. | DisplayToken The corresponding DisplayToken or null in case of error. |
| 5 | UC 3 | getToken( ) Get the token for sending to POS. | ItemId, Domain ItemId: IP specific identifier of the item of interest. Domain: domain of the requested token, necessary in case of multi-purpose items. | Token The item data to be transferred to POS. This data is opaque for the wallet. |
| 6 | UC 5 | notifyUsage( ) Called by the wallet to forward item usage data (like coupon redemption status or the number of loyalty points collected) from POS to the item provider. | ItemId, UsageData ItemId: IP specific identifier of the item of interest. UsageData: Opaque data about the item usage status. | StatusCode |
| 7 | UC 6 | removeItem( ) Remove an item from the wallet. The item provider shall not provide this item anymore with next getItems( ) call. Whether the item is deleted on IP side is out of scope. | ItemId ItemId: IP specific identifier of the item to be removed. | StatusCode |

TABLE 2-continued

Service Provider Interface

| Use Case Nr. (UC) | Function | Input Parameter | Return |
|---|---|---|---|
| 8  UC 7 | importItem( ) Advise the item provider to import a new item the wallet has received through its input channels, like NFC or QR code. | ItemData ItemData: IP specific identifier of the default item. | StatusCode |
| 9  UC 8 | setDefault( ) Flag an item to be the default item of this domain. This information is mainly relevant for the wallet, but the IP shall be notified about the default state. This way additional actions can be taken. | ItemId ItemId: IP specific identifier of the default item. | StatusCode |
| 10 UC 8 | unsetDefault( ) Remove default flag of an item. This information is mainly relevant for the wallet, but the IP shall be notified about the default state. This way additional actions can be taken. | ItemId ItemId: IP specific identifier of the default item. | StatusCode |
| 11 UC 9 | invokeItem( ) Get the current metadata for an item. This can be the current account balance of a payment card. | ItemId, InvokationPara ItemId: IP specific identifier of the item to be invoked. InvokationParameter: opaque data from JavaScript, to be forwarded to and interpreted by item provider | InvokationPara |
| 12 UC 10 | launchCatalogue( ) Launch the item catalogue of the item provider app. The user may select several items to be provided to the wallet. | Domain Domain: The domain of items of interest. | StatusCode |

Data Type Specification

Primitive Data Types

Primitive data types are basic data types, like string, integer or arrays, which may have restricted value ranges like enumerations.

The On-Device API uses the following primitive types:

| Name | Type | Description |
|---|---|---|
| StatusCode | Integer | Set of fixed status codes. 0 for success. |
| ItemId | String | Item provider specific identifier of an item |
| Token | Byte[ ] | Opaque item data from the item provider. This data can be GS1 encoding or any else. Syntax and semantic needs to be understood between the IP and the interaction point. |
| UsageData | Byte[ ] | Usage status of an item. Syntax and semantic needs to be understood between the IP and the interaction point. |
| ItemData | Byte[ ] | Item provider specific representation of item data |

-continued

| Name | Type | Description |
|---|---|---|
| InvokationPara | Byte[ ] | Item provider specific representation of parameters to be invoked. |
| Domain | Enum <coupon, loyalty, ...> | Type of an item |
| Name | String | Name |
| Description | String | Description |
| Domains | enum[ ] | Set of domains |
| Image | Byte[ ] | Provider image |
| Callback | String | Callback URL to the item provider implementation of this On-Device API |

Complex Data Types

Complex data types are composite data types containing multiple member attributes.

DisplayToken

The DisplayToken consists of the following attributes:

| Name | Type | Description |
|---|---|---|
| id | String | IP unique item identifier |
| name | String | Display name of the item |
| domain | Integer | Domain (identity = 1/payment = 2/loyalty = 3/event = 4/travel = 5/access = 6/coupons = 7) |
| type | String | Type of the card |
| imageUrl | URL | URL pointing to the image to be displayed. The image might contain dynamic data to be presented to the user, like loyalty points, or the coupon's product and discount. This attribute is optional in case imageEmbedded is present. |
| imageEmbedded | Byte[ ] | Base64 encoded image to be displayed. This attribute is optional in case imageUrl is present. |
| shortDescription | String | HTML representation of the short description used in list views. |
| detailedDescription | String | HTML representation of the detailed description. |
| issuer | String | Issuer of the card |
| timeIssued | Date-time | Optional: Card is valid from this date/time |
| timeExpires | Date-time | Optional: Card is expires at this date/time |

Implementation on Android OS

The platform independent On-Device API defined above needs to be mapped to Android mechanisms for inter-app communication. First, available inter-app mechanisms will be introduced that will be used for the API mapping. Subsequently, the On-Device API for Android will be defined, which suits for implementation.

Inter-App Communication on Android

Android is designed to host a variety of applications and to maximize user choice. The platform is intended to eliminate the duplication of functionality in different applications, to allow functionality to be discovered and invoked on the fly, and to let users replace applications with others that offer similar functionality. Applications must have as few dependencies as possible, and must be able to contract out operations to other applications that may change at the user's discretion.

Inter-process communication (IPC) is thus the basis for some key features of the Android programming model. The techniques relevant for the On-Device API are:

Intents

These enable an application to select an activity based on the action one wants to invoke and the data on which they operate. In other words, one does not need a hardcoded path to an application to use its functions and exchange data with it. Data can be passed in both directions using "Intent" objects, and this enables a convenient, high-level system of inter-process communication.

Parts of the On-device-APIs shall be implemented using intents. Intents can be launched in various ways:

1. Intents can be broadcast to any receiver.
2. Intents can be fired off to a particular receiver, and results will be ignored.
3. Intents can be fired off to a particular receiver, and the sender gets notified of results.

In the case of option 3 the receiver of the intent can find information about the sender by calling Activity.getCallingPackage( ) For this reason, all operations of the wallet interface will be mapped to Android intents in such a way that they expect a result:

If the function expects a result, this is the case anyway.

If the function does not expect a result, the Android intent is implemented such that it expects an "int" result. The value "0" shall indicate not error. Values larger than "0" shall indicate an error.

Most, but not all, operations of the ItemProvider interface shall be mapped to Android Intents. Depending on whether a result is required or the caller can continue only after the operation was finished, Intents will use launch option 2—Activity.startActivity( ) or launch option 3—Activity.startActivityForResult( ).

Operation for item retrieval will use another, more efficient IPC mechanism provided by Android by the name ContentProvider.

ContentProvider

Content providers manage access to a structured set of data. Content providers are the standard interface that connects data in one process with code running in another process.

Wallet Interface Mapping

All operations provided by the wallet interface will be mapped to the Android intent mechanism. Intent objects will be used for operation input and output parameters.

Login( )

The login intent sent by Item Providers informs the electronic wallet (e.g. mWallet) about its existence on the handset. Next to name, description, and image of the provider it provides an endpoint URI to the ContentProvider, for querying DisplayTokens, and an Intent action prefix, which will be used by the electronic wallet (e.g. mWallet) for invoking Intent based operations of the ItemProvider interface. The login intent shall be sent on two events:

1. Proactively during each item provider application startup
2. On retrieval of a register intent broadcasted by the electronic wallet (e.g. mWallet)

Details of this broadcast are described below as part of the Item Provider interface Mapping The Intent for mapping the login operation is defined by following attributes:

| Attribute Type | Name | Value Type | Description |
|---|---|---|---|
| Action | de.dtag.tlabs.wallet.cards.intent.action.LOGIN | | Operation to be invoked |
| Extra | de.dtag.tlabs.wallet.cards.intent.extra.DOMAIN | String | Supported domains of the application to be registered (couponing = 1/loyalty = 2) |

-continued

| Attribute Type | Name | Value Type | Description |
|---|---|---|---|
| Extra | de.dtag.tlabs.wallet.cards.intent.extra.NAME | String | Name of the registered app displayed to the user |
| Extra | de.dtag.tlabs.wallet.cards.intent.extra.CARD_AUTHORITY | URI | Authority URI of the card ContentProvider |
| Extra | de.dtag.tlabs.wallet.cards.intent.extra.CARD_HANDLER | String | Intent prefix used by mWallet to construct the action parameter to be used with an intent for invoking On-Device API operations. |
| Extra | de.dtag.tlabs.wallet.cards.intent.extra.SHORTDESCRIPTION | String | Short description of the item provider |
| Extra | de.dtag.tlabs.wallet.cards.intent.extra.DETAILDESCRIPTION | String | Detailed description of the item provider |
| Extra | de.dtag.tlabs.wallet.cards.intent.extra.IMAGEURL | URL | URL to the item provider image |
| Extra | de.dtag.tlabs.wallet.cards.intent.extra.IMAGEEMBEDDED | BYTE[ ] | Item provider image |
| Extra | de.dtag.tlabs.wallet.cards.intent.extra.AUTHTOKEN | String | Authentication token |
| Extra | de.dtag.tlabs.wallet.cards.intent.extra.AUTHTOKEN_TYPE | String | Token type ("SHARED_KEY") | useItem( )

The useItem operation may be invoked by the item provider app to open the electronic wallet (e.g. mWallet) with a preselected item, which can be invoked immediately.

The Intent for mapping the useItem( ) operation is defined by following attributes:

| Attribute Type | Name | Value Type | Description |
|---|---|---|---|
| Action | WalletAPI.UseCard | | Operation to be invoked |
| Extra | Issuer | String | Item issuer |
| Extra | CardId | String | Item ID |
| Extra | de.dtag.tlabs.wallet.cards.intent.extra.AUTHTOKEN | String | Access token |

This operation is called with Activity.startActivity( ) and does not return a result Intent.

Item Provider Registration

On retrieval of a register intent, which is broadcasted to the android system on startup of the electronic wallet (e.g. mWallet), the IP application shall send the above defined login intent to the electronic wallet (e.g. mWallet).

For retrieving the broadcast intent the IP application needs to implement a class extending Android's BroadcastReceiver class and overriding the onReceive( ) method. In the manifest file of the receiving activity the broadcast receiver class has to be declared and the register intent has to be defined in the intent-filter.

```
<receiver
    android:name="de.dtag.tlabs.wallet.api.cards.CardProviderRegistration"
    android:enabled="true" >
    <intent-filter>
        <action android:name="de.dtag.tlabs.wallet.cards.intent.action.REGISTER" />
    </intent-filter>
</receiver>
```

The mWallet will call the android.content.ContextWrapper.sendBroadcast(Intent intent) method with the following intent attributes:

| Attribute Type | Name | Type | Description |
|---|---|---|---|
| Action | de.dtag.tlabs.wallet.intent.action.REGISTER | | Action to be invoked |

Content Provider Definition

Most operations of the SP interface are data centric and can easily be mapped to SQL database like queries. For this purpose Android Content Providers are used which provide for sharing sets of structured data across application boundaries.

For the Android platform the operations getItems( ) and getDisplayToken( ) of the IP interface are implemented using the ContentProvider feature. The wallet uses the ContentProvider mechanism for querying and updating data provided by the IP app. The IP app needs to implement a ContentProvider conforming to the definitions described in the following.

The provider's manifest definitions shall be as follows:

```
<provider android:label="CardProvider"
    android:authorities="<YOUR_AUTHORITY>"
    android:name=".CardProvider"
    android:readPermission="de.dtag.tlabs.mwallet.provider.ReadCards"/>
```

The ContentProvider shall provide one table, which is addressed through the following attributes:

Authority: content://<YOUR_AUTHORITY>
List path: cards
Item path: cards/#

For example a single card item shall be accessible through the URI:

content://de.dtag.tlabs.mwallet.provider.cardprovider/Cards/#<CARD_ID>

The following data types shall be used and mapped to the Android CursorWindow class:

| Type name | Cursor Type Mapping |
|---|---|
| String | CursorWindow.putString( ) |
| Integer | CursorWindow.putString( ) |
| Short | CursorWindow.putString( ) |
| Long | CursorWindow.putLong( ) |
| Double | CursorWindow.putDouble( ) |
| Byte[ ] | CursorWindow.putBlob( ) |

The item table shall provide the following list of columns, which are attributes of the DisplayToken as defined above plus some parameters required for mapping the IP interface operations to Android's ContentProvider mechanism.

| Name | Type | Description |
| --- | --- | --- |
| _id | Integer | Numeric ContentProvider Id |
| id | String | Maps to DisplayToken.id |
| issuer | String | Maps to DisplayToken.id |
| name | String | Maps to DisplayToken.name |
| domain | Short | Maps to DisplayToken.domain |
| type | String | Maps to DisplayToken.type |
| imageUrl | String | Maps to DisplayToken.imageUrl |
| imageEmbedded | Byte[ ] | Maps to DisplayToken.imageEmbedded |
| listDescription | String | Maps to DisplayToken.shortDescription |
| detailedDescription | String | Maps to DisplayToken.detailedDescription |
| expiryTime | String | Maps to DisplayToken.timeExpires |

To enable automatic view updates in the electronic wallet (e.g. mWallet) the Cursor instances returned by ContentProvider.query( ) operation should have set the provider's content URI with cursor.setNotificationUri(CONTENT_URI). This is a mandatory constraint for a later change notification in case of the data set will be changed. Please refer, e.g., to the removeItem( ) operation described below.

Intent Mapping

The following operations of the Item Provider interfaces are mapped to Android Intents. This section defines the Intent action and extra attributes for each operation.

getToken( )

The getToken operation is a mandatory operation called by the electronic wallet (e.g. mWallet) to retrieve token to be used within a transaction. Depending on the transport channel the token is displayed via QR Code, transferred via NFC or sent as HTTP request to a callback URI.

The Intent for mapping for this operation is defined by following attributes:

| Attribute Type | Name | Type | Description |
| --- | --- | --- | --- |
| Action | <ITEM_PROVIDER_PREFIX>.intent.action.GetCardToken | | |
| Extra | Issuer | String | Item Issuer |
| Extra | CardId | String | Item ID |
| Extra | Domain | String | Domain of the token in case of multi purpose items |
| Extra | RequestBundle | Bundle | Additional attributes |
| The operation getToken is called with Activity.startActivityforResult( ) and does expect a result Intent with the following attributes. | | | |
| Extra | Token | Byte[ ] | Result | notifyUsage( )

If provided by the item provider, the notifyUsage operation will be called by the electronic wallet (e.g. mWallet) when an item was used in a transaction. It is up to the IP to interpret the payload parameter or to perform any actions on this event. For example one-time-use items like coupons may be marked as redeemed and removed from the wallet.

The Intent for mapping for this operation is defined by following attributes:

This operation is called with Activity.startActivity( ) and does not return a result

| Attribute Type | Name | Type | Description |
| --- | --- | --- | --- |
| Action | <ITEM_PROVIDER_PREFIX>.intent.action.NotifyUsage | | |
| Extra | Issuer | String | Item Issuer |
| Extra | CardId | String | Item ID |
| Extra | Payload | Byte[ ] | Data received from the interacting party during a transaction. | removeItem( )

If provided by the item provider the removeItem operation will be called by the electronic wallet (e.g. mWallet) when the user deletes an item. It is up to the IP to remove the item from its own data store, but the item shall not appear anymore in the cursor returned with the next ContentProvider query( ) call.

The Intent for mapping for this operation is defined by following attributes:

| Attribute Type | Name | Type | Description |
| --- | --- | --- | --- |
| Action | <ITEM_PROVIDER_PREFIX>.intent.action.DeleteCard | | |
| Extra | Issuer | String | Item Issuer |
| Extra | CardId | String | Item ID |

This operation is called with Activity.startActivityForResult( ) and to wait for deletion and to check the result code.

The implementing IP shall call context.getContentResolver( ).notifyChange(CardProvider.CARD_CONTENT_URI, null) to trigger the electronic wallet (e.g. mWallet) view update.

importItem( )

If provided by the item provider the importItem operation will be called by the electronic wallet (e.g. mWallet) when a new item was received. For example a coupon may be issued as result of a payment transaction. It is up to the IP to interpret the data and to store the item in its own data store. The item shall appear in the cursor returned with the next ContentProvider query( ) call.

The Intent for mapping for this operation is defined by following attributes:

| Attribute Type | Name | Type | Description |
| --- | --- | --- | --- |
| Action | <ITEM_PROVIDER_PREFIX>.intent.action.ImportCard | | |
| Extra | Issuer | String | Item Issuer |
| Extra | CardId | String | Item ID |

This operation is called with Activity.startActivityForResult( ) to wait for deletion and to check the result code.

The implementing IP shall call context.getContentResolver( ).notifyChange(CardProvider.CARD_CONTENT_URI, null) to trigger the electronic wallet (e.g. mWallet) view update.

setDefault( )

If provided by the item provider the setDefault operation will be called by the electronic wallet (e.g. mWallet) when an item is marked as a default item. For example a payment card may be pre-selected for transactions to allow fast pay or low power mode. It is up to the IP to activate a cardlet or perform any other action.

The Intent mapping for this operation is defined the following attributes:

| Attribute Type | Name | Type | Description |
|---|---|---|---|
| Action | <ITEM_PROVIDER_PREFIX>.intent.action.SetDefaultCard | | |
| Extra | Issuer | String | Item Issuer |
| Extra | CardId | String | Item ID |

This operation is called with Activity.startActivityForResult( ) to wait for deletion and to check the result code.

unsetDefault( )

If provided by the item provider the unsetDefault operation will be called by the electronic wallet (e.g. mWallet) when a default item is unset.

The Intent for mapping for this operation is defined by following attributes:

| Attribute Type | Name | Type | Description |
|---|---|---|---|
| Action | <ITEM_PROVIDER_PREFIX>.intent.action.UnsetDefaultCard | | |
| Extra | Issuer | String | Item Issuer |
| Extra | CardId | String | Item ID |

This operation is called with Activity.startActivityForResult( ) to wait for deletion and to check the result code.

invokeItem( )

If provided by the item provider the invokeItem operation will be called by the electronic wallet (e.g. mWallet). Java Script in the detailed description HTML may invoke a wallet.invoke operation and pass any kind of parameters to it. Usually, a JSON String is passed here. The electronic wallet (e.g. mWallet) will forward this to the item provider, by invoking the invokeItem operation. It is up to the IP to interpret the parameter and return a result JSON String, which passed by electronic wallet (e.g. mWallet) to the WebView. This way dynamic information of an item, like the number of loyalty points, may be displayed.

The Intent for mapping for this operation is defined by following attributes:

| Attribute Type | Name | Type | Description |
|---|---|---|---|
| Action | <ITEM_PROVIDER_PREFIX>.intent.action.InvokeCard | | |
| Extra | Issuer | String | Item Issuer |
| Extra | CardId | String | Item ID |
| Extra | Parameter | String | Item provider specific JSON |
| This operation is called with Activity.startActivityforResult( ) and does expect a result intent with the following attributes. | | | |
| Extra | Parameter | String | Item provider specific JSON |

This operation is called with Activity.startActivityForResult( ) and does expect a result Intent with the following attributes.

launchCatalogue( )

If provided by the item provider the launchCatalogue operation will be called by the electronic wallet (e.g. mWallet). It is expected the IP application opens and provides the user a list of additional item to be put into the wallet.

The Intent for mapping for this operation is defined by following attributes:

| Attribute Type | Name | Type | Description |
|---|---|---|---|
| Action | <ITEM_PROVIDER_PREFIX>.intent.action.LaunchCardImport | | |
| Extra | Domain | String | Item Issuer |

This operation is called with Activity.startActivity( ) and does not return a result Intent.

Protection of On-Device APIs

From the wallet's perspective, a secure On-Device API is critical to prevent wallet function and data from being accessed by unregistered third party apps. An unsecured API would open doors of opportunity to the hostile applications, which could add spam data into the wallet or collect sensitive data. Nevertheless there will be single methods free to be used by any application and others to be used only in case of strong authentication.

It should be pointed out that the access control to the On-Device API is under control of the provider. As this requirement conflicts with some mobile operating system's security architecture, additional protection mechanisms need to be defined at the On-Device API level. In addition to this the mobile user is free to grant third party app the right for accessing the wallet on OS level.

The wallet supports different kinds of items, such as coupons, loyalty cards, payment cards, and more in future. It is obvious that the potential loss and damage is quite different for each card type nature. To cope with the corresponding protection needs, the registered third party apps will be assigned to a protection profile during registration process at DT. The assigned profile defines the security measures that the app has to comply with. Depending on the assigned profile a limited set of functions of the wallet's On-Device API is accessible. The assignment is agreed between Deutsche Telekom and the third party developer based on a risk and business analysis for the third party, card issuers and the end-users.

Figure 8:
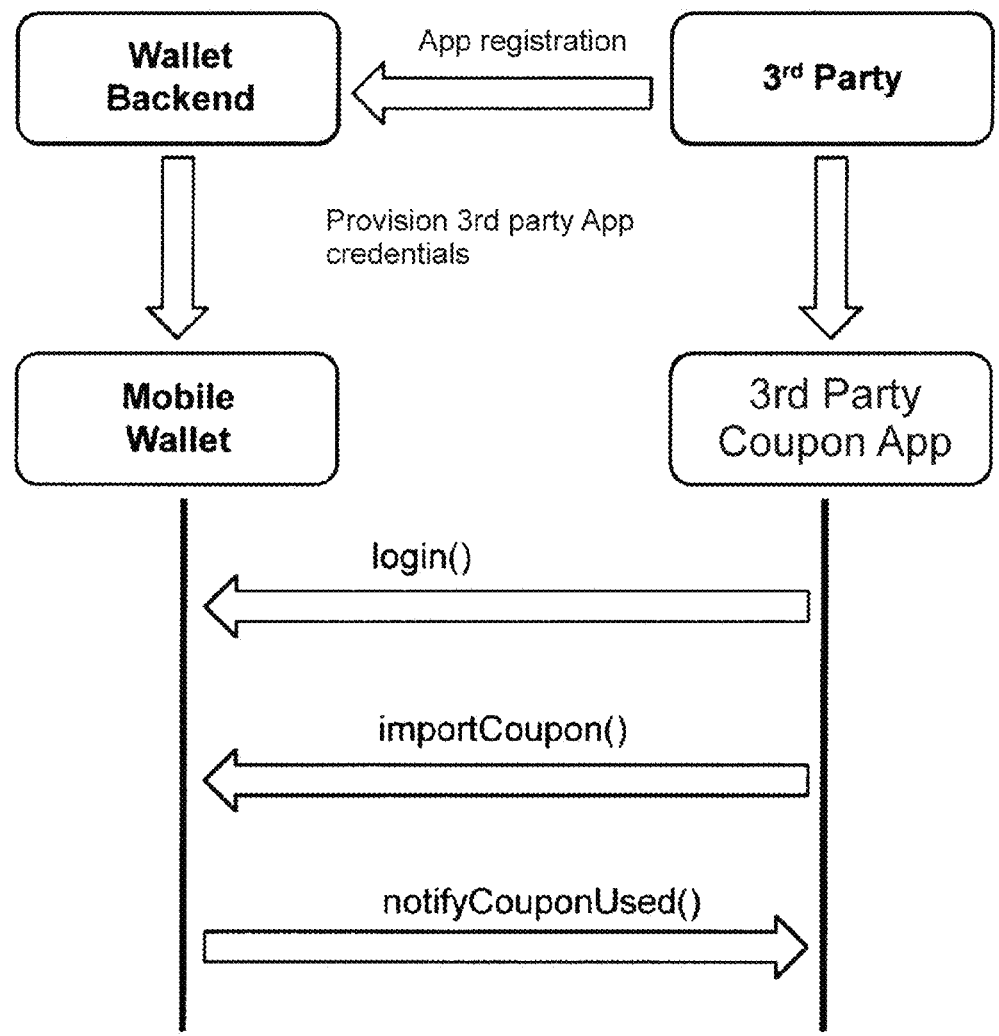
FIG. 8: Dependencies between the wallet and an app of a third-party.

The wallet implements all defined protection profiles. It knows the assignment between a third party app and the associated protection profile, which assures that the third party app authenticates itself with correct authentication mechanism and credentials. In addition to this the wallet will be updated with new assignments, in case that new third-party app is registered into wallet backend system and accepted by DT. FIG. 8 shows these dependencies.

Third Party App Protection Profiles

The following protection profiles and derived security measures are defined and implemented by the wallet.

Assumption: Security measures assume a non-compromised mobile operating system. In case the system is affected with malware like key logger or spyware the measures can be bypassed.

Assumption: Security measures defined by the profiles require that On-Device inter-process-communication is protected by the operating system and secured against man-in-the-middle attacks or sniffing. The data exchanged between the wallet and the third party app will not be encrypted.

The app provider should be sensitive to potential damages caused by the app at end-user or card issuer side if misused or malicious changed. The decision about which protection profile the developer should select is a trade off between damage potential and efforts for App development and key distribution.

Figure 9:
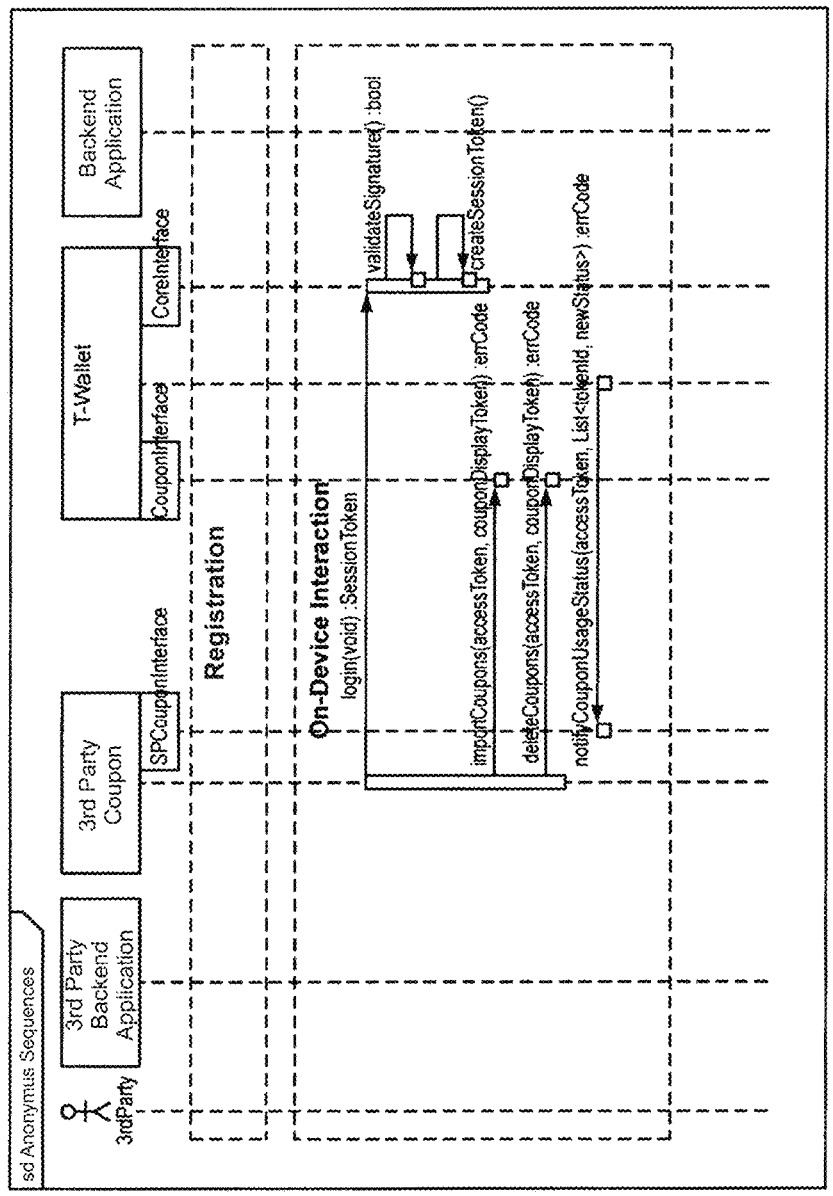
FIG. 9: A sequence diagram of an anonymous profile.

Anonymous Profile (FIG. 9)

The Anonymous Profile cannot be seen as a true protection profile as any third party application unknown to the wallet is categorized to this profile. It does not require credentials passed by the third party app for identifying the application.

The profile aims at apps, which may only want to use the subset of non-critical functions provided by the wallet, which are free to use by any application.

FIG. 9 shows the actions to be taken for using the non-protected On-Device API on a high level.

As the On Device API demands an access token for each operation call, a login method without any credentials has to be called initially. The result will be a session token which is required for calling each API operation.

Figure 10:
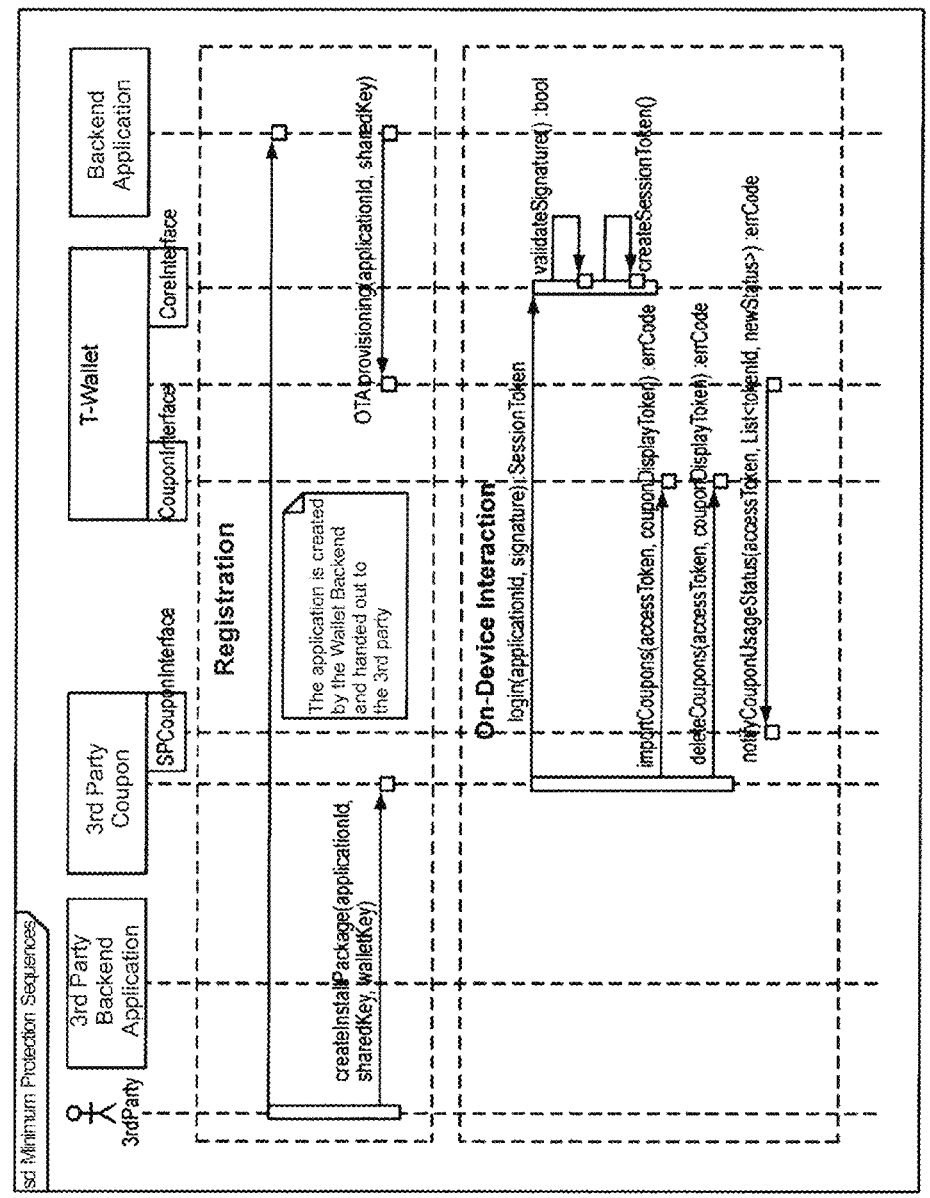
FIG. 10: A sequence diagram of a profile with minimum protection.

Minimum Protection Profile (FIG. 10)

The Minimum Protection Profile aims at protecting the wallet against unexpected usage of the On-Device API to prevent damage and misuse by third party Apps at a basic protection level. It provides basic protection for low development and organizational efforts to third party developers or card issuer. But it does not protect against malicious attacks, as it will be possible to spy out credentials with some efforts in sniffing or re-engineering.

This profile aims at apps without damage potential to the end-user and only minimum damage potential to the card-issuer. For example it suits for free couponing apps or loyalty card apps, which cannot cause any financial damage to the end-user due to the functional nature of the card. Damage potential to the card issuer can limited in combination with unique card IDs and real-time validity checks at the point of sale during redemption.

The following predefinitions come with this profile:
Single wallet identity across all installations the wallet's application identity will be the same for all wallet installations on various mobile phones. This means that common credentials will be used, which need to be known to third party apps.
Single third party app identity across all installations of a third party app will act as the same identity across all installations.
Conclusion: Once a secret/credential used for authentication is compromised, all other installations are potentially compromised too.

Based on these predefinitions this profile defines the following protection measures:
Mutual authentication based on a message authentication code (MAC) using a shard secret, packaged and deployed with the third party App.
Authorization based on one time access token.

FIG. 10 shows the single actions to be taken for On-Device API usage on a high level.

Figure 11:
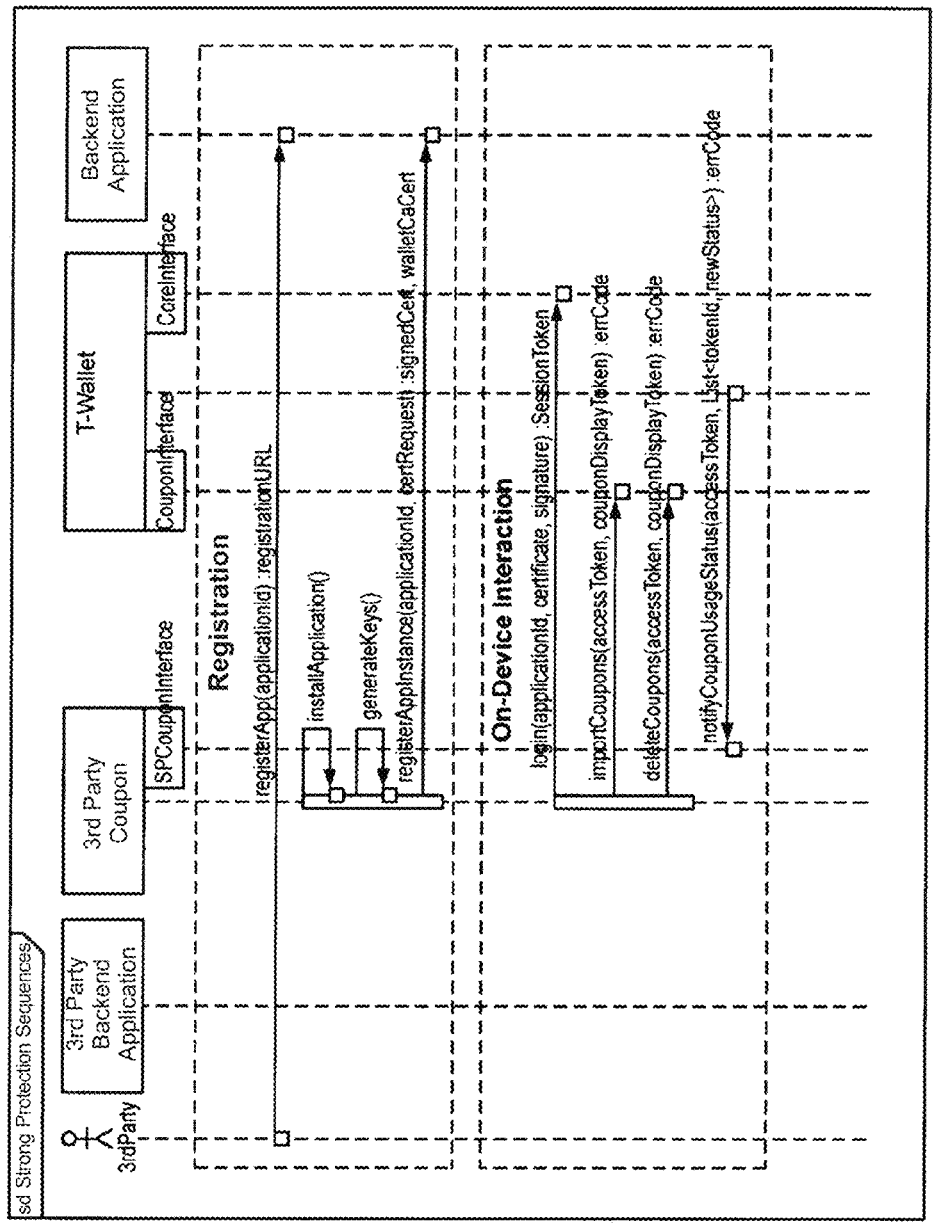
FIG. 11: A sequence diagram of a profile with high protection.

Strong Protection Profile (FIG. 11)

The Strong Protection Profile aims at protecting the wallet to prevent damage and misuse by malicious third party Apps. It cryptographically assures the third party App is known to and trusted by the wallet. As a result development and key provisioning efforts are non-trivial. The profile protects the wallet against usage of unregistered third party Apps and does not allow re-engineering of credentials.

It aims at apps with significant damage potential to the user or to the card issuer. For example it suits for gift couponing apps or tickets, which have monetary value and possibly for payment cards.

The following predefinitions come with this profile:
Individual identity for each wallet installation
The wallet's application identity will be unique for all wallet installations on various mobile phones. Individual credentials need to be verifiable by third party apps.
Individual third party app identity for each third party app installation
Each third party app identity will act as an individual identity in the wallet domain.
Conclusion: Once a secret/credential used for authentication is compromised only a single app/wallet is affected and can be banned without affecting other mobile users.

This profile defines the following protection measures:
Mutual authentication of wallet and third party app based on digital signature using asynchronous key cryptography.
Authorization is based on temporary session key/token.

FIG. 11 shows the single actions to be taken for On-Device API usage on a high level.

App Registration Process

The sequence diagrams in the sections above give a brief impression of the steps necessary for secure On Device communication. Details shall be given in the next sections.

Initial step for third party app/wallet communication is the registration phase, in which the third party app is made known to the wallet ecosystem and other way around. Depending on the Protection Profile assigned to the third party app, some of the registration details differ from profile to profile. Details are described per profile in the next two subsections.

Registration Process for Anonymous Profile

No registration of anonymous apps is necessary.

Registration Process for Minimum Protection Profile Third Party Apps

The Minimum Protection Profile defines authentication mechanism between third party app and wallet, which is based on a shared secret. The wallet ecosystem needs to know the secret of the third party App and the third party App needs to know the secret of the wallet. Shared key exchange is done in registration process, in which the third party developer registers the App at the DT wallet backend after developer registration and login.

The following parameters will be exchanged for app registration:
The following parameters will be exchanged for app registration:

| Name | Direction | Description |
| --- | --- | --- |
| sharedKey | Input | Shared key to be used by the $3^{rd}$ party app for authentication. Depending on OS capabilities this may be a generated random key or the digital signature of the installation package. |
| applicationID | Output | ID which identifies the app in the wallet ecosystem |
| walletKey | Output | Shared key to be used by the wallet for authentication. Depending on OS capabilities this may be a generated random key or the digital signature of the installation package. |

The third party app developer is responsible for packaging the three parameters to the installation package or deploy the information after installation of the app for example through his own backend system.

All wallet installations will be updated with the list of valid application IDs and shared keys via OTA channel. This sensitive information will be stored securely in the UICC.

Registration Process for the Strong Protection Profile

One major difference to the Minimum Protection Profile is that each installation (wallet and third party app) acts as a individual identity in the wallet ecosystem. This increases the number of existing identities, which requires either a strict assignment between the wallet and the third party app installations, or a certificate hierarchy helping lowering the identity management efforts.

The latter is introduced here, which results in a two-step registration process for the Strong Protection Profile.

In the first step the third party app is registered by the developer at the wallet backend. The following parameters will be exchanged:

| Name | Direction | Description |
| --- | --- | --- |
| application ID | Input | Name and version of the $3^{rd}$ party app. The ID will be used for issuing certificate of individual installations in the second registration step. |
| registrationURL | Output | The URL the $3^{rd}$ party app needs to connect with in the second registration step. |

The second registration step has to be performed by the third party app and the wallet and takes place after the application is installed on the mobile. The third party app and wallet have to generate a private/public key pair, which is securely stored by the application (UICC in case of the wallet). On IP connectivity a certificate request is sent to the wallet backend URL for signing the newly created public key. In case of the third party app the URL was retrieved in the first step and packaged in the app installation package. The backend will check the sender's identity based on the mobile network and booked service offerings.

The following parameters will be exchanged in the second registration step:

| Name | Direction | Description |
| --- | --- | --- |
| applicationId | Input | Name and version of the $3^{rd}$ party app. The ID will be used for issuing certificate of individual installations in the second registration step. |
| certRequest | Input | Public key certificate request to be signed by the Wallet Backend with the RootCA trusted by the wallet. |
| signedCert | Output | Certificate of the $3^{rd}$ party app installation. |
| walletCaCert | Output | List of trusted CA certificates. In case of the wallet is calling this method, this parameter contains the CA cert(s) for verifying the $3^{rd}$ party app certificates. In case of the $3^{rd}$ party app is calling this operation, this parameter contains the wallet CA cert for verifying the Wallet certificates. |

The signed certificate and the wallet CA certificate are returned to be third party app installation. The certificate in combination with a signature will be passed by the third party app to the wallet during authentication process. The wallet CA cert is used for verifying the wallet's certificate for mutual authentication.

Authentication Process

Before the wallet's On-Device API can be used the parties need to authenticate (each other). Depending on the agreed Protection Profile the app has to provide specific credentials and is required to use a profile specific authentication method provided by the wallet API.

The wallet processes the login call, verifies the credentials, and finally acts as a Security Token Service issuing a session token. The session token contains a temporary session key and additional attributes, which are required later on for calculating an access token to be passed with each API call.

The resulting SessionToken is independent of specific protection profiles and has the following format:

| Name | Description |
| --- | --- |
| sessionId | Unique identifier |
| pid | process id of the calling application, to assure the token is issued by the correct process (pid of the caller needs to be verified by the wallet during access token validation). |
| validFrom | start time of token validity. |
| validTo | Expiration time of the token, for assuring the application does re-authenticate frequently. |
| encSesskionKey | the shared session key used for calculating and verifying access tokens on subsequent API calls. The session key is encrypted with the Wallet's credentials, which is the shared key in the Minimum PP, or Wallet's private key when using the Strong PP). Encryption prevents anyone else to obtain the session secret. |
| signature | a signature is signing all token attributes to prevent token modification during transit. Signature is created with the Wallet's credentials, which is the shared key in the Minimum PP, or Wallet's private key when using the Strong PP). |

Authentication Process for the Anonymous Profile

Apps not registered to the wallet need a session token for calculating a one-time access token with each API call. The session token is retrieved by invoking the login method without passing any credentials. The wallet will assign the session to the anonymous profile and allow only methods being called, which are free to use by any application.

Authentication Process for the Minimum Protection Profile

Authentication as defined for the Minimum Protection Profile is based on a shared secret between the wallet and the third party app. third Party apps authenticate at the wallet by invoking the login method. To prevent the shared key is made available to other applications, which might also retrieve the login call (for example in case that the mechanism intended for Android is used for IPC), the shared key is not passed directly with the call. As an alternative the shred key is used for calculating a HMAC, which is passed with the call.

The login method provides the following parameters:

| Name | Direction | Description |
| --- | --- | --- |
| applicationId | Input | Unique identifier provided by the Wallet Backed to the $3^{rd}$ Party during App registration process. |

-continued

| Name | Direction | Description |
|---|---|---|
| hmac | Input/Output | Message authentication code computed by hashing the application ID + timestamp + nonce + shared key, which was provided by the Wallet Backed to the 3$^{rd}$ party during app registration process. The wallet returns a new HMAC using the same calculation rules but its own shared key, which is known to the 3$^{rd}$ party app by the registration process. |
| timestamp | Input/Output | Timestamp used to calculate the hmac |
| nounce | Input/Output | Random number to calculate the hmac |
| sessionToken | Output | Token containing the session key |

During invocation of the login method the wallet first checks the assignment of the application ID and the protection profile. If the wallet knows about the app's assignment to the Minimum Protection Profile, the provided HMAC will be verified by performing the same steps as the third party app did, but using the shared key registered to the given application ID. On success a session token including the temporary session key and another HMAC for authenticating the wallet to the third party app is created and returned.

The third party app is free to validate the returned HMAC for checking the wallet's identity.

Authentication Process for the Strong Protection Profile

Authentication as defined for the Strong Protection Profile is based on a digital signature calculated with the app's private key and a certificate hierarchy. The same mechanism is used at the side of the third party and the wallet for enabling mutual authentication.

Third Party apps authenticate at the wallet by invoking the login method, thereby providing the following parameters:

| Name | Direction | Description |
|---|---|---|
| applicationId | Input | Unique identifier provided by the Wallet Backed to the 3$^{rd}$ Party during App registration process. |
| signature | Input/Output | Digital signature computed by hashing the application ID + timestamp + nonce and encrypting the hash with the app's private key. The wallet returns a new hmac using the same calculation rules but its own shared key, which is known to the 3$^{rd}$ party app by the registration process. |
| certificate | Input/Output | Certificate to be used for verifying the signature |
| timestamp | Input/Output | Timestamp used to calculate the hmac |
| nounce | Input/Output | Random number to calculate the hmac |
| sessionToken | Output | Token containing the session key |

During invocation of the login method the wallet first checks the assignment of the application ID and the protection profile. If the wallet knows about the assignment to the Strong Protection Profile, the given digital signature will be validated. This is done by decrypting the signature with the given certificate and comparing the decrypted hash value with the result of its own hash calculation following the same steps as the third party app did. At last the certificate has to be validated and checked whether it is trusted, which means it is issued by one of the trusted CA certs known to the wallet. The wallet returns a session token including a temporary symmetric key and additional attributes, which will be used for further On Device API calls. The third party app is free to validate the returned HMAC for checking the wallet's identity.

On Device API Usage Process

As already stated the On Device API may be used only, if the third party app has successfully authenticated to the wallet and retrieves a session token. It may use all wallet API operations that are associated to the protection profile the app complies to. For example a coupon application may use all methods exposed by the CoreWallet interface and the Coupon interface.

An API call is processed by the wallet only, if a valid access token is passed as first parameter of the call. The access token is a one-time token and is calculated by the sender of the message (either third party app or the wallet) with help of the session token, which has been exchanged as result of a successful authentication. The format of the token and the processing rules do not differ between the protection profiles. As a result no profile specific steps have to be described in this section.

The access token format is a custom format aligned to popular standardized token formats, which unfortunately target at network communication protocols, which not necessary apply for the wallet On-Device API. For example OAuth is married with HTTP and SAML with XML format, but the On Device API may be mapped to Android's intend mechanism.

The AccessToken consists of the following attributes:

| Name | Description |
|---|---|
| sessionId | ID identifying the current session (token) |
| timestamp | current time |
| nonce | random string |
| signature | HMAC calculated out of the three token attributes from above plus the session key from the session token. |

Including a nonce and timestamp to the signature calculation assures the access token is valid only for one time usage and prevents replay attacks in case of another process on the mobile phone has captured an API call.

Before processing the API call functionality the access token has to be validated on receiver side. First the signature is validated by calculating the HMAC signature by processing the same calculation steps as the sender did, but using the shared key form the session token. On successful access token validation, the attributes of the session token are validated. This step validates the validFrom and validTo attributes of the session token and matches the process ID of the sender with the PID in the session token. Only if both tokens are validated successfully, the method is processed.

Although the invention has been described in detail by means of the figures and the associated description, this presentation and this detailed description are illustrative and exemplary and are not to be understood as limiting the invention. It is understood that those skilled in the art can make changes and modifications without departing from the scope of the following claims. In particular, the invention also comprises embodiments including any combination of features which are mentioned above or shown on various aspects and/or embodiments.

The invention also includes individual features in the figures even if they are shown therein in conjunction with other features and/or are not specified above.

Furthermore, the term "include" and derivations thereof do not exclude other elements or steps. Also, the indefinite article "a" or "an" and derivatives thereof do not exclude a plurality. The functions of several features stated in the claims are fulfilled by one unit. The terms "substantially", "about", "approximately", and the like in connection with a property or a value in particular define the exact property or the exact value. Any reference symbols in the claims should not be construed as limiting the scope of the claims.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for terminal device-based communications between a third-party application and an electronic wallet, wherein the electronic wallet is installed on a terminal device, wherein the electronic wallet supports an On-Device Application Program Interface (API) integrated therein, wherein the third-party application is installed on the terminal device, wherein the third party application also supports the On-Device API, and wherein the method comprises:

the third-party application setting up a connection to an Internet service, wherein the connection requires a data transfer to the Internet service;

the third-party application receiving a request aimed at transmission of data from the Internet service;

the third-party application setting up a communication channel between the third party application and the electronic wallet within the terminal device via the On-Device API;

verifying by the electronic wallet, an access right of the request of the third party application on the basis of security criteria defined in the On-Device API;

the third-party application forwarding the request received from the Internet service to the electronic wallet if the access right of the third party application on the electronic wallet is approved;

the electronic wallet processing the request and generating a corresponding response;

forwarding the response from the electronic wallet via the On-Device API to the third party application, wherein the third party application forwards the response to the Internet service: and the third party application receiving a confirmation about successful forwarding of the reply to the Internet service;

wherein a security element is further connected to the terminal device; and wherein the electronic wallet processing the request and generating the corresponding response comprises:

the electronic wallet sending a request concerning the data to the security element; and the electronic wallet receiving a response concerning the data from the security element.

2. The method according to claim 1 wherein the security element is configured for wireless radio communications.

3. The method according to claim 1, wherein the security element is a Universal integrated Circuit Card (UICC) or a Subscriber Identity Module (SIM) card.

4. The method according to claim 1, wherein the terminal device is adapted for mobile communications and/or is adapted for wireless local area network (WLAN) communications.

5. The method according to claim 4, wherein the terminal device is a mobile device, a smart phone, a laptop, a notebook or a tablet computer.

6. The method according to claim 1, wherein the data comprises confidential and/or user-specific information.

7. The method according to claim 1, further comprising:
transmitting the data from the electronic wallet to a wallet backend;
establishing a connection between the wallet backend and the Internet service;
transmitting the data from the wallet backend to the Internet service.

8. The method according to claim 1, further comprising:
transmitting the data from the electronic wallet to the third-party application;
transmitting the data from the third-party application to the Internet service.

9. The method according to claim 1, wherein the third-party application is a service provider application installed on the terminal device that is configured to use the Internet service or is an Internet browser installed on the terminal device.

10. A system for terminal-based communications between one or more third-party application(s) and an electronic wallet, the system comprising:

a terminal device;

wherein an electronic wallet is installed on the terminal device;

wherein the electronic wallet supports an On-Device Application Program Interface (API) integrated therein;

wherein one or more third-party application(s) are installed on the terminal device;

wherein the one or more third party application(s) also support the On-Device API;

wherein the one or more third-party application(s) are each configured to:

set up a connection to an Internet service, wherein the connection requires a data transfer to the Internet service;

receive a request of the Internet service aimed at transmission of data;

set up a communication channel between the third party application and the electronic wallet within the terminal device via the On-Device API; and pass the request received from the Internet service to the electronic wallet;

wherein the electronic wallet is configured to:

verify an access right of the request of the third party application based on security criteria defined in the On-Device API:

process the request and generate a corresponding response if the access right of the third party application on the electronic wallet is approved;

forward the response via the On-Device API to the third party application, wherein the third part application is configured to forward the response to the Internet service;

wherein the one or more third-party application(s) are each further configured to: receive a confirmation of a performed forwarding to the Internet service;

wherein the terminal device is configured to incorporate one or more security elements;

wherein one or more API(s) are installed on the terminal device to list, select and interact with the security elements;

wherein the system further comprises:

one or more security element(s) that are incorporated in the terminal device, wherein the terminal device is connected to the one or more security element(s); and wherein processing the request and generating the corresponding response comprises:

sending requests for the data to the one or more security element(s); and receiving responses concerning the data from the one or more security element(s).

11. The system according to claim 10, wherein the security element is configured for wireless radio communications.

12. The system according to claim 10, wherein the security element is a Universal Integrated Circuit Card (UICC) or a Subscriber Identity Module (SIM) card.

13. The system according to claim 10, wherein the terminal device is adapted for mobile communications and/or is adapted for wireless local area network (WLAN) communications.

14. The system according to claim 10, wherein the terminal device is a mobile device, a smart phone, a laptop, a notebook or a tablet computer.

15. The system according to claim 10, wherein the data comprises confidential and/or user-specific information.

16. The system according to claim 10, wherein the electronic wallet is further configured to:

transmit the data to a wallet backend; and wherein the wallet backend is configured to:

establish a connection between the wallet backend and the Internet service; and transmit the data to the Internet service.

17. The system according to claim 10, wherein the electronic wallet is further configured to transmit the data to the one or more third-party application(s); and wherein the one or more third-party application(s) each are further configured to transmit the data to the Internet service.

18. The system according to claim 10, wherein the one or more third-party application(s) include a service provider application installed on the terminal device that is configured to use the Internet service or an Internet browser installed on the terminal device.

* * * * *